(12) United States Patent
Beach et al.

(10) Patent No.: US 8,498,054 B2
(45) Date of Patent: Jul. 30, 2013

(54) IMAGE DIVERSION SYSTEMS AND METHODS FOR IMAGE CAPTURE DEVICES

(75) Inventors: Kirk W. Beach, Issaquah, WA (US); Jonathan D. Cowles, Newcastle, WA (US); Kyle Johnston, Sammamish, WA (US); Ai Thi-Khiem Cowles, Newcastle, WA (US)

(73) Assignee: iOculi, Inc., Seattle, WA (US)

( * ) Notice: Subject to any disclaimer, the term of this patent is extended or adjusted under 35 U.S.C. 154(b) by 49 days.

(21) Appl. No.: 12/905,969

(22) Filed: Oct. 15, 2010

(65) Prior Publication Data

US 2011/0109971 A1   May 12, 2011

Related U.S. Application Data

(63) Continuation-in-part of application No. 12/744,456, filed as application No. PCT/US2010/031523 on Apr. 16, 2010.

(60) Provisional application No. 61/170,556, filed on Apr. 17, 2009.

(51) Int. Cl.
    *G02B 27/10*   (2006.01)
(52) U.S. Cl.
    USPC .......................................................... 359/618

(58) Field of Classification Search
    USPC .......................................................... 359/618
    See application file for complete search history.

(56) References Cited

U.S. PATENT DOCUMENTS

| 6,449,103 B1 | 9/2002 | Charles | 359/725 |
| 2003/0120183 A1 | 6/2003 | Simmons | 600/595 |
| 2005/0007514 A1 | 1/2005 | Faris | 349/58 |
| 2006/0274188 A1 | 12/2006 | Mowry | 348/335 |
| 2008/0088587 A1 | 4/2008 | Pryor | 345/158 |
| 2008/0144156 A1* | 6/2008 | Goodman et al. | 359/226 |
| 2009/0027622 A1 | 1/2009 | Lalley et al. | 353/28 |

* cited by examiner

*Primary Examiner* — James Jones
(74) *Attorney, Agent, or Firm* — Graybeal Jackson LLP

(57) ABSTRACT

Disclosed herein are systems that divert images for image capture devices. An image diversion system includes a deviating optical element to provide a first view to an imager of an image capture device and to provide at least a second view to the imager. An image diversion system includes a first deviating optical element and a second deviating optical element optically coupled to the first deviating optical element. The first deviating optical element provides a first view and at least a second view to an imager of an image capture device. An image diversion system includes a first deviating optical element, a second deviating optical element, and at least one corrective lens. The image diversion system is contained within a housing that is attachable to a housing portion of an image capture device.

15 Claims, 41 Drawing Sheets

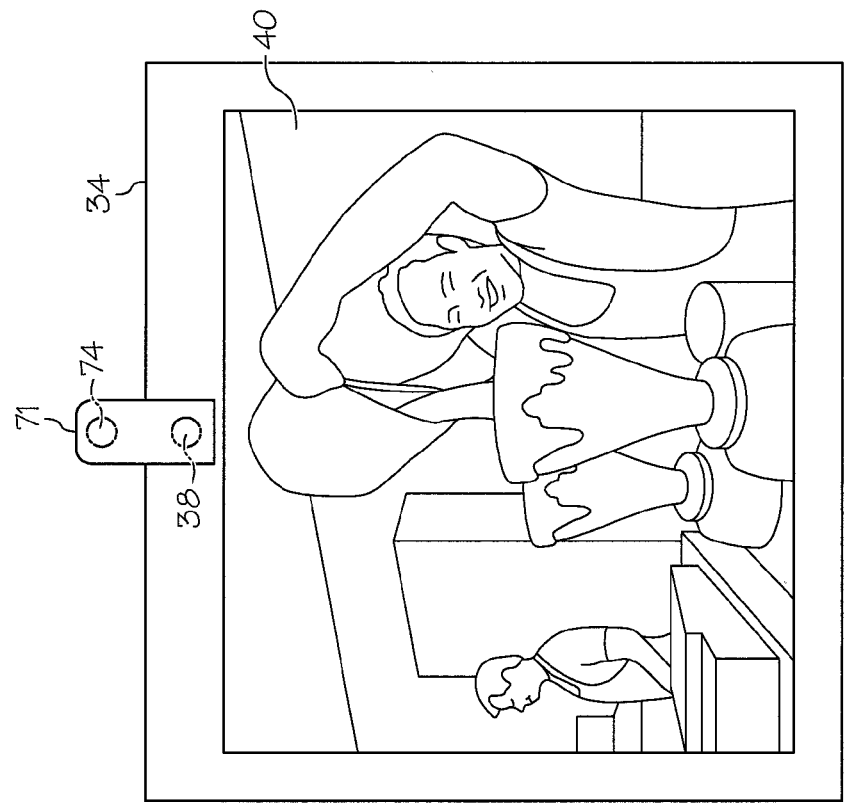
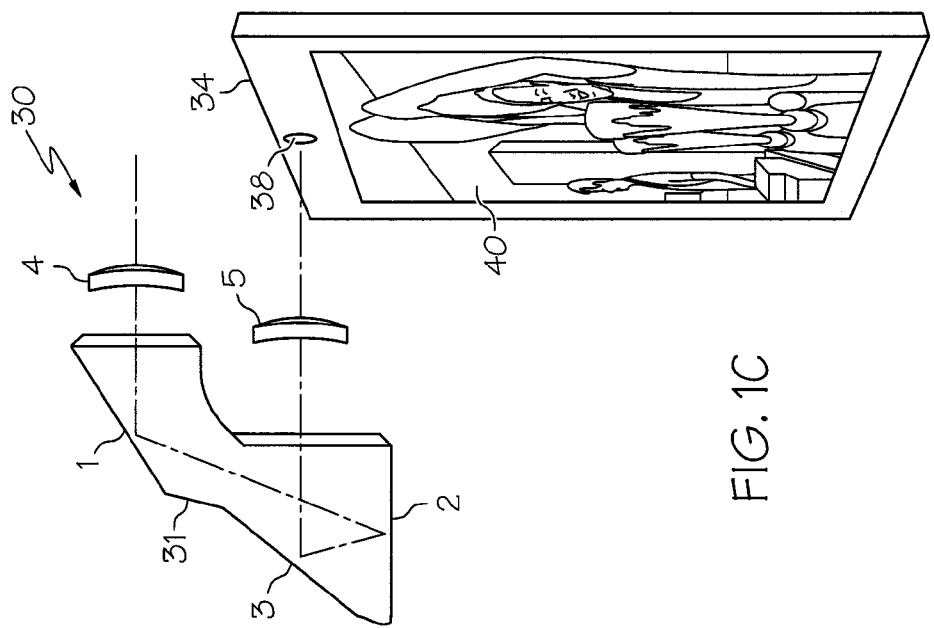
FIG. 1D
FIG. 1C

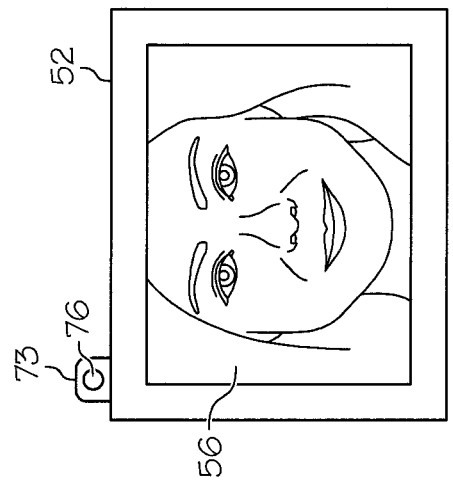
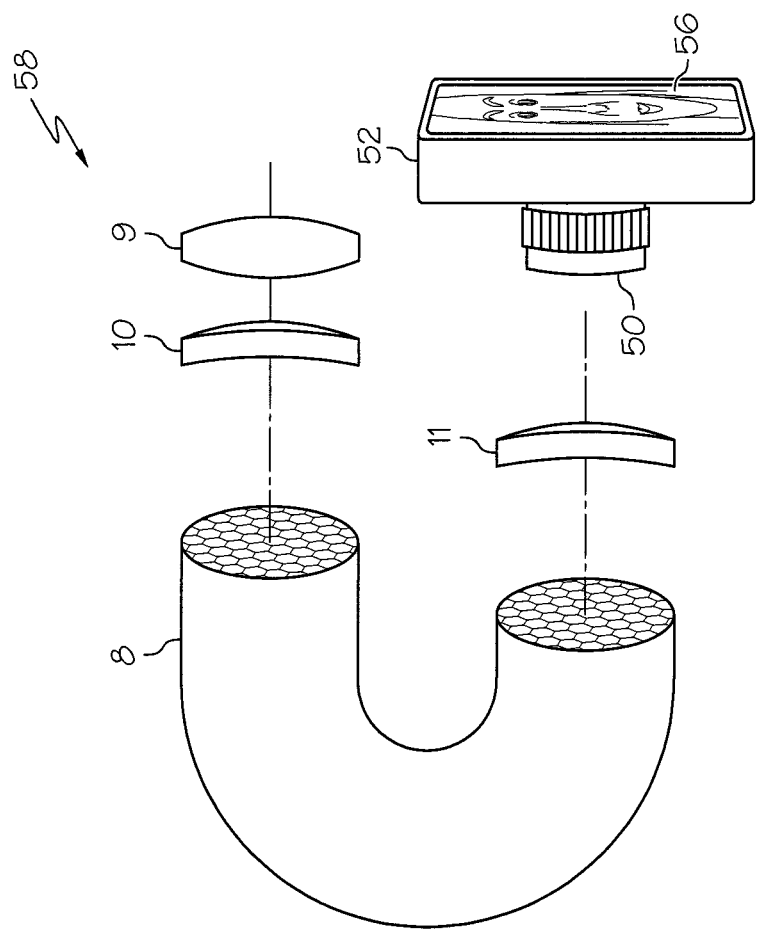
FIG. 3B
FIG. 3A

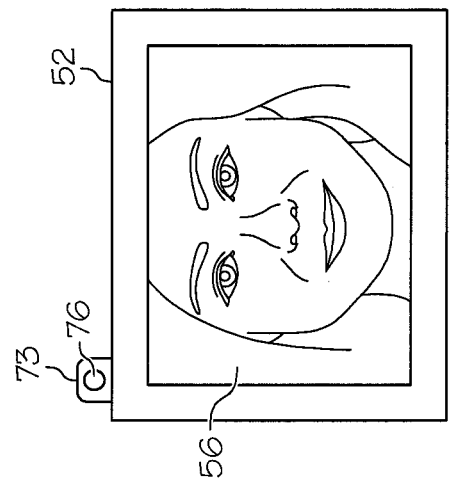
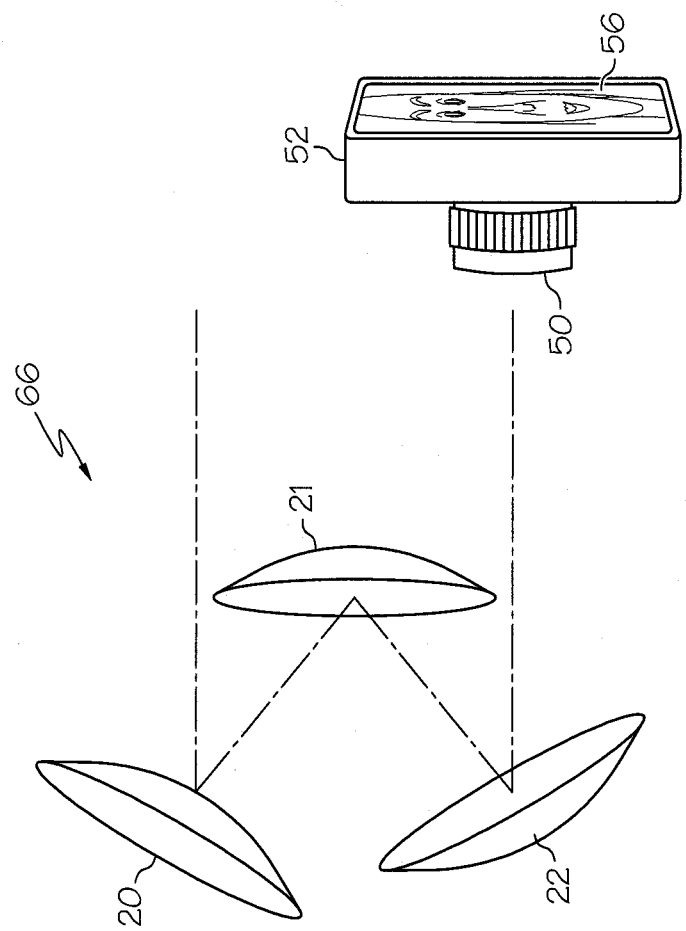
FIG. 7B
FIG. 7A

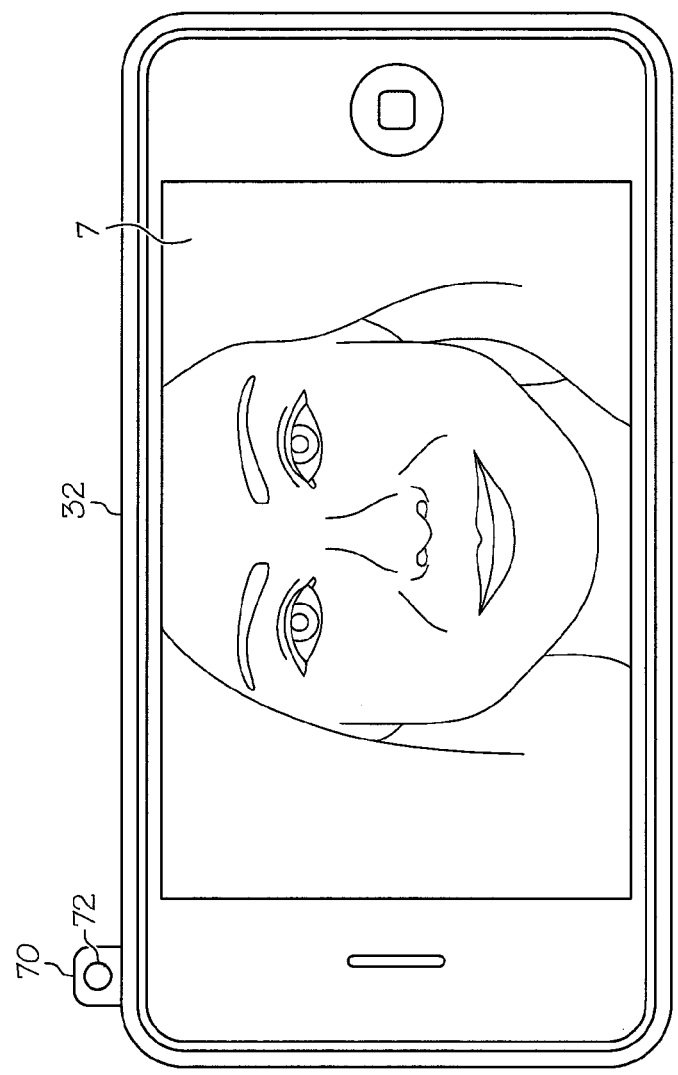
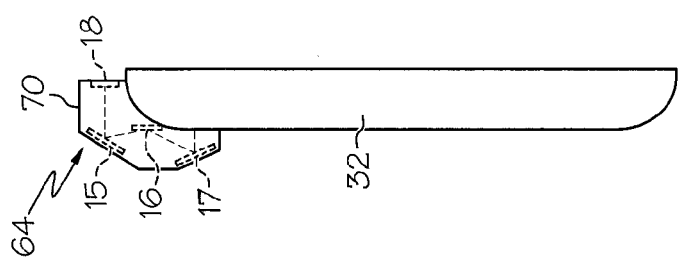
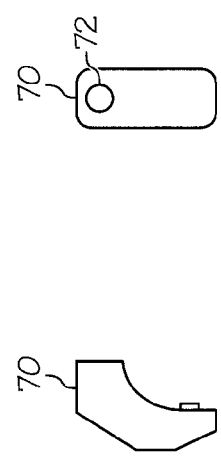
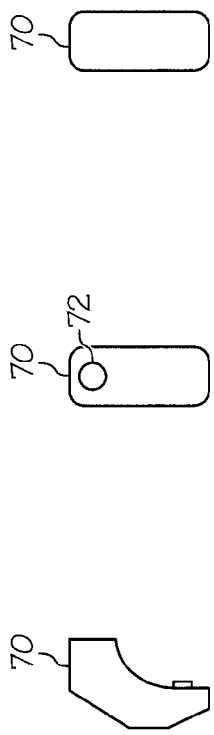

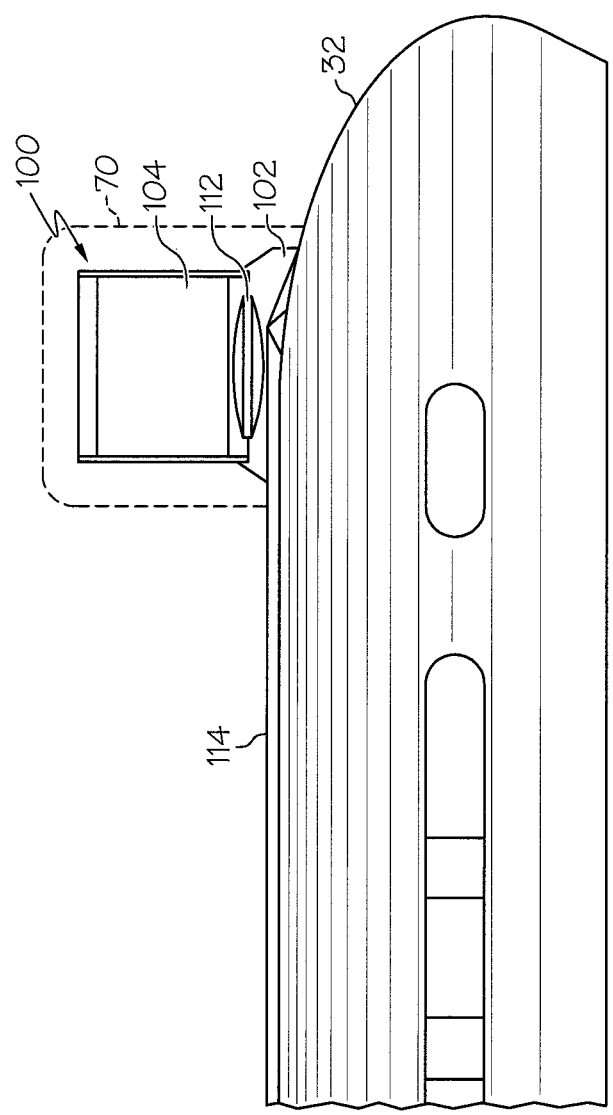

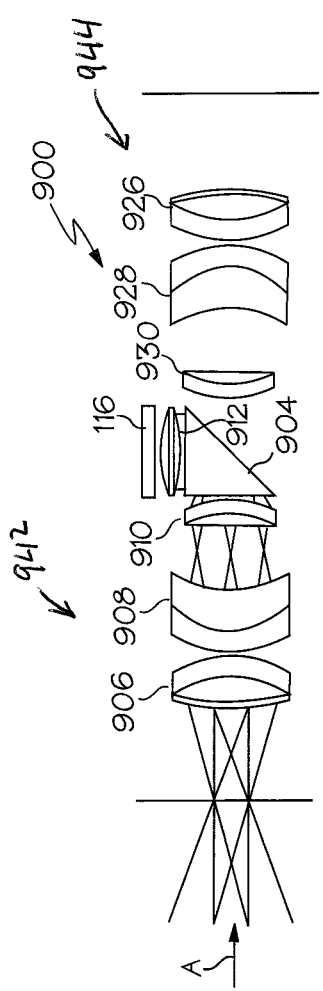
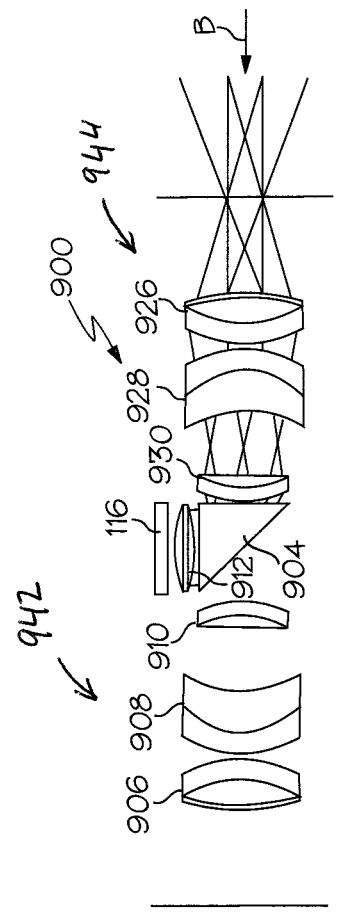
FIG. 15A
FIG. 15B

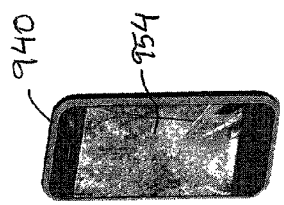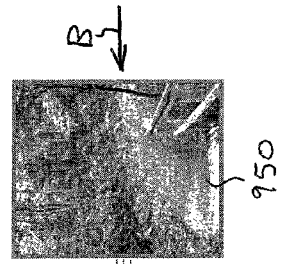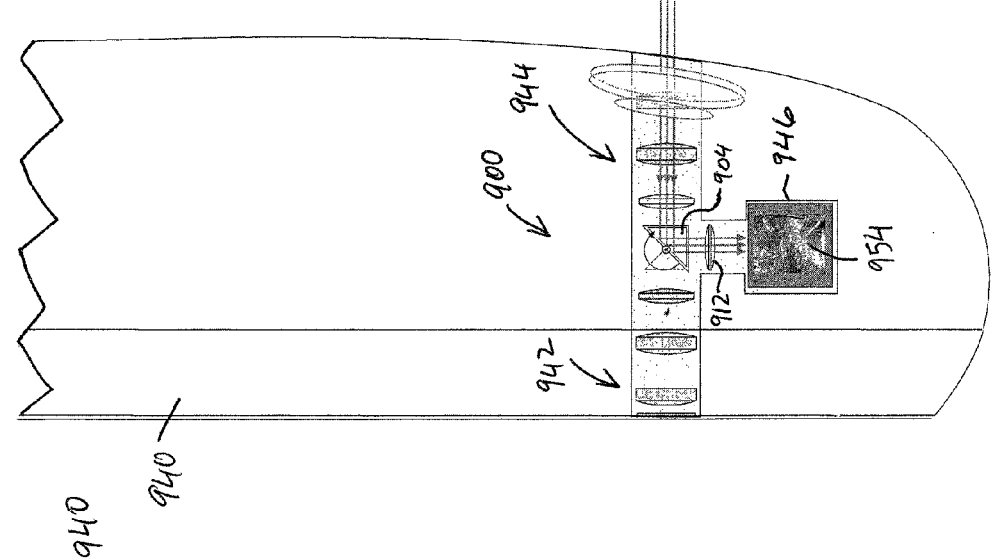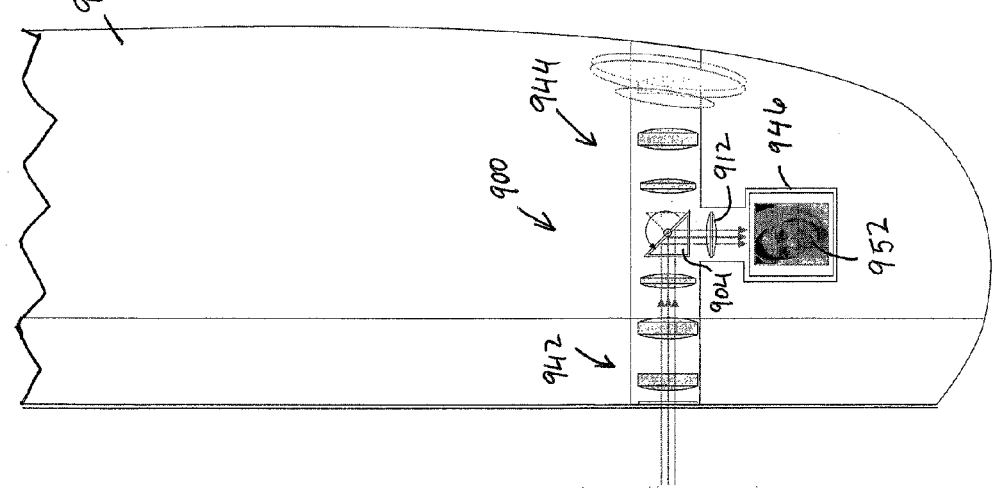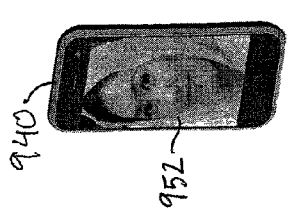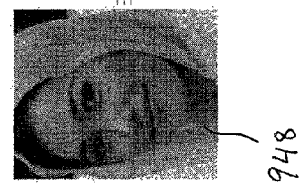

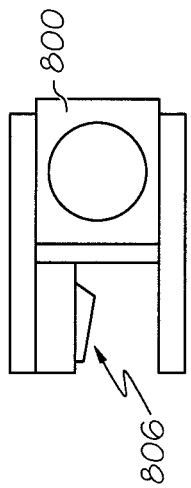
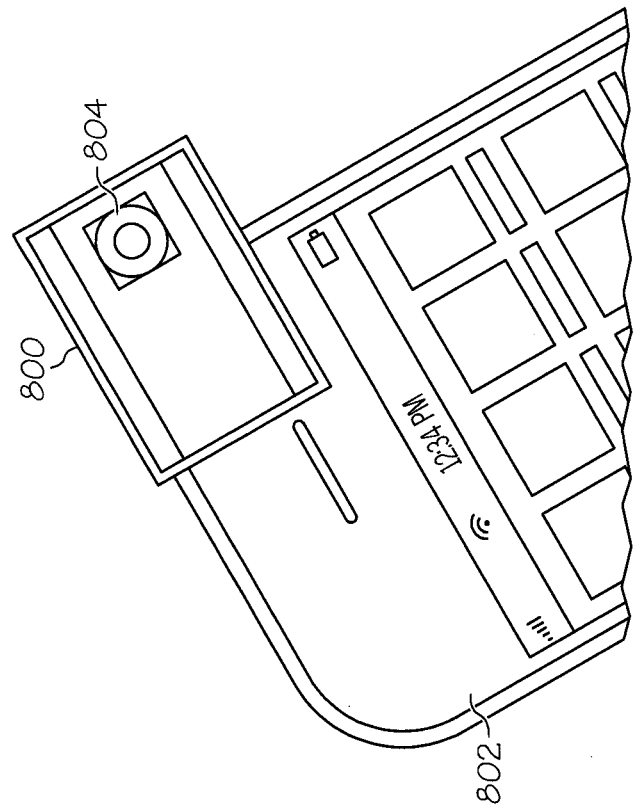

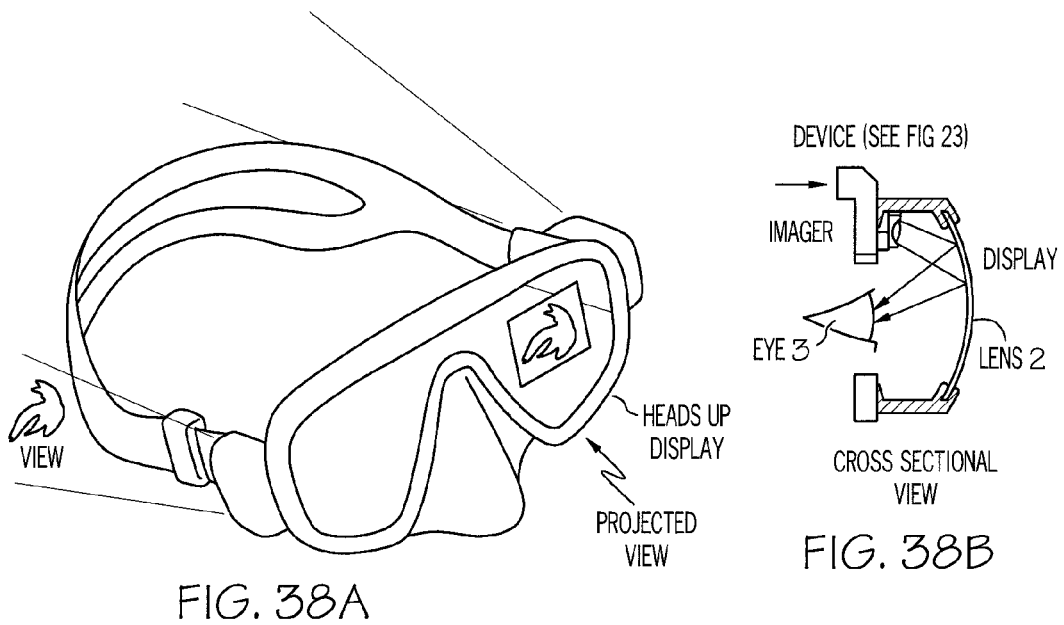
FIG. 38A
FIG. 38B
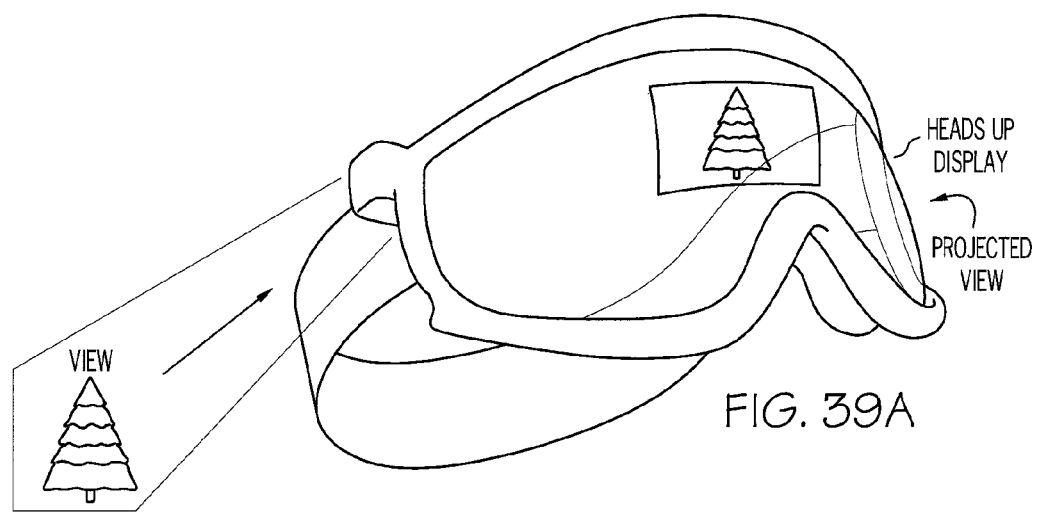
FIG. 39A
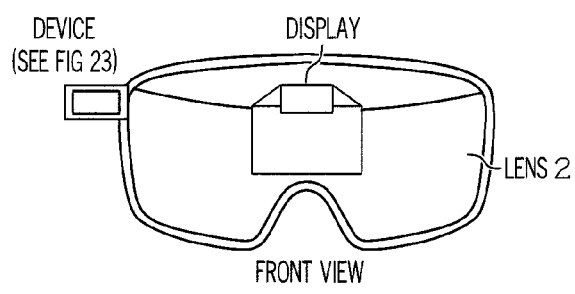
FIG. 39B

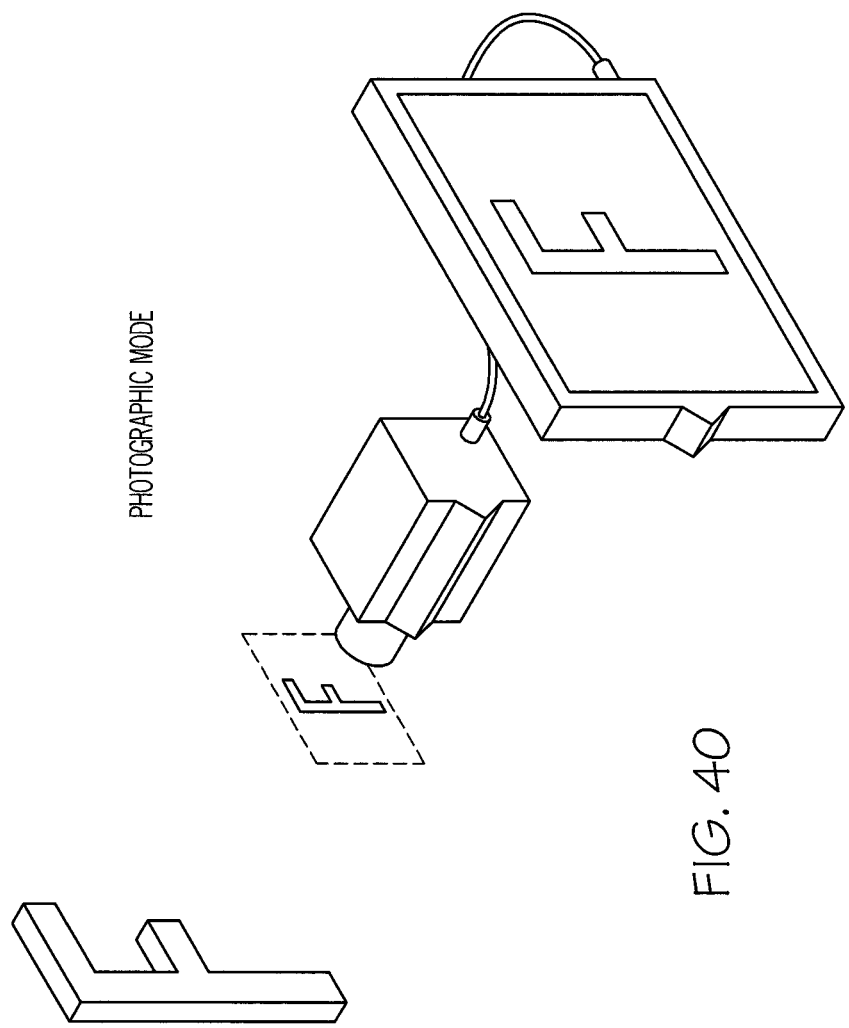
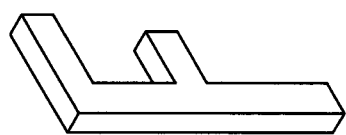
FIG. 40

IMAGE DIVERSION SYSTEMS AND METHODS FOR IMAGE CAPTURE DEVICES

CROSS REFERENCE TO RELATED APPLICATIONS

This application is a continuation in part of U.S. application Ser. No. 12/744,456, filed on May 24, 2010, which is a U.S. national phase application of International Application Ser. No. PCT/US2010/031523 filed Apr. 16, 2010, which claims the benefit of U.S. Provisional Application No. 61/170,556 filed Apr. 17, 2009. The entire disclosure of each of these applications is incorporated herein by reference. This application claims priority to each of these previous applications, to the extent appropriate.

FIELD

Disclosed herein are systems and methods that divert images for image capture devices.

BACKGROUND

Conventional film cameras allow an approximate preview of the image that will be captured by looking through the viewfinder or the lens that will capture the image. Conventional film cameras have not, however, allowed the actual image that will be captured to be previewed.

Digital cameras commonly have the ability to preview images on a display screen before they are captured. As with conventional film cameras, however, it is generally not possible to adequately preview an image when taking a self portrait. This is because the lens is generally on the opposite side of the camera from the preview screen.

Some mobile phone providers have attempted to address this problem by adding a second display on the same surface as the camera lens, or, by placing a small reflective surface near the lens to give the subject a preview of what is being captured. Additionally, some mobile phones and digital video cameras are equipped with a rotating preview screen (LCD display) that can be turned to point in the same direction as the lens. There are drawbacks, however, associated with these approaches. For example, the provided small reflective surfaces often do not accurately convey the image that will be captured. Rotating preview screens are complex pieces that are expensive, cannot be retrofitted onto existing devices and are prone to breakage. Second preview screens (LCD displays) are expensive and cannot be retrofitted. Accordingly, there is room for improvement in image diversion and preview systems for image capture devices.

SUMMARY

Disclosed herein are systems and methods that allow image diversion and the ability to preview the diverted image that will be captured when using image capture devices. The systems and methods disclosed herein utilize housings adapted to mount onto existing image capture devices. In one embodiment, the housings may comprise one or more optical elements that divert the image that is captured and its projection onto an associated preview screen. In various embodiments, the one or more optical elements may comprise one or more reflective, refractive, or diffractive surfaces, one or more total internal reflection (TIR) elements, one or more lens elements, and/or any combinations thereof. As used herein, a lens may comprise one or more optical elements including, for example, a stack of lenses forming a system or assembly of lenses. As used herein, an image may be real or virtual.

The systems and methods disclosed herein are superior to the aforementioned diversion and/or preview methods because they allow diverted image preview to take place on the larger preview screen as opposed to the smaller additional LCD screen or small mirror. The systems and methods can also be passive devices that are less likely to fail than more complex rotating hinge devices. Additionally, and as stated, the systems and methods disclosed herein can be configured to mount onto existing image capture devices whereas this could not be accomplished with a rotation screen or an additional preview screen of any size.

One embodiment includes an image diversion system comprising a housing, at least one optical element within the housing and a mounting mechanism wherein the housing is adapted to mount onto an existing image capture device and wherein the at least one optical element can divert the image that is captured by the image capture device when the housing is mounted on the image capture device.

Another embodiment includes a method for diverting the image captured by an image capture device, wherein the method comprises providing a housing and at least one optical element within the housing and a mounting mechanism. In one embodiment, the housing is adapted to mount onto an existing image capture device. In another embodiment, the at least one optical element can divert the image that is captured by said image capture device when said housing is mounted on said image capture device.

In another embodiment, the system is adapted to mount onto and divert the image captured by an existing device selected from the group consisting of a multi-purpose personal device, a cell phone, a digital camera, a video camera, and a conventional film camera. In another embodiment, the system is adapted to mount onto glasses, ski goggles, scuba gear or snorkeling gear.

In another embodiment the housing contains three reflective surfaces.

In another embodiment the reflective surfaces divert the image by 180°.

Particular system and method embodiments disclosed herein can maintain a field of view of at least 10°, at least 20°, at least 30°, at least 40°, or at least 50°.

In one embodiment, an image diversion system is adapted to visually identify a user to establish a dynamic biometric identifier comprising any one of a moving retina or a walking gait of the user.

In another embodiment, an image diversion system is adapted to identify, lock or unlock a device, account or document and enable a remote activation of the image capture device to reverse view and identify the face of the user.

In another embodiment, an image diversion system is adapted to correct visual identification of a caller to receive or reject a video call. A picture taken of a caller can be transmitted along with the phone call to allow the person receiving the call to see the caller's face at the same time as the call is ringing.

In another embodiment, an image diversion system is adapted as a visual controller that uses changes in a user's face to control, emote or otherwise animate a character in a game. For example, the image diversion system can be employed as an optical eye tracking mouse to perform various functions such as hanging up by tracking a blink of an eye.

In various other embodiments, an image diversion system can be adapted to provide remote mobile visual monitoring, visual aspects of communication with sign language and lip reading, and visual and verbal chat.

In various embodiments, an image diversion system includes a deviating optical element to provide a first view to an imager of an image capture device and to provide at least a second view to the imager. In one aspect, the deviating optical element is rotatably positionable in a first position to provide the first view and at least a second position to provide the second view. In another aspect, the deviating optical element is rotatably positionable in multiple positions to provide a corresponding number of views to said imager. In yet another aspect, the deviating optical element comprises a right-angled prism or a beam splitter to provide a simultaneous view in at least two directions to said imager. In a further aspect, the image diversion system includes a first set of corrective lenses optically coupled to the deviating optical element to couple light entering from a first side of the image capture device and a second set of corrective lenses optically coupled to the deviating optical element to couple light entering from at least a second side of the image capture device In various embodiments, an image diversion system includes a first deviating optical element and a second deviating optical element optically coupled to the first deviating optical element. The first deviating optical element provides a first view and at least a second view to an imager of an image capture device. In one aspect, the first deviating optical element is rotatably positionable in a first position to provide the first view and at least a second position to provide the second view. In another aspect, the first deviating optical element is rotatably positionable in multiple positions to provide a corresponding number of views to said imager. In yet another aspect, the first deviating optical element is rotatably positionable about 90° relative to the second deviating optical element. In a further aspect, the first deviating optical element comprises a right-angled prism or a beam splitter to provide a simultaneous view in at least two directions to said imager. In yet another aspect, the image diversion system includes a set of corrective lenses optically coupled to the first deviating optical element and to the second deviating optical element to couple light entering from the image capture device.

In various embodiments, an image diversion system includes a first deviating optical element, a second deviating optical element, and at least one corrective lens. The image diversion system is contained within a housing that is attachable to a housing portion of an image capture device. In one aspect, the second deviating optical element is rotatably positionable over a 45° degree angle. In another aspect, light from an object enters from a first direction and passes through the at least one corrective lens and light emerging from the at least one corrective lens is reflected by an input surface of the first deviating optical element. In yet another aspect, light reflected by the input surface of the first deviating optical element is reflected by the second deviating optical element in a first direction. In a further aspect, the image diversion system includes at least a second corrective lens. When the second deviating optical element is rotated 45°, light from an object enters from a second direction that is substantially 180° apart from the first direction and the light passes through the least second corrective lens. In still a further aspect, the second optical element includes a right-angled prism or a beam splitter to provide a simultaneous view in at least two directions to said imager.

BRIEF DESCRIPTION OF THE FIGURES

FIG. 1C shows one embodiment of one of the devices mounted on a personal computer (PC) screen equipped with an image capture device in the monitor and allows a forward view from the backward facing image capture device.

FIG. 1D is a front view of one embodiment of the optical system shown in FIG. 1C mounted on a PC type image capture device displaying the captured image on a display thereof.

FIG. 3A is a graphical representation of one embodiment of a fused bundle fiber optic system utilizing a fused fiber optic bundle with a positive lens element, a negative lens element, and a third lens element to magnify the incoming image.

FIG. 3B is a front view of one embodiment of one embodiment of the optical system shown in FIG. 3A mounted on a digital camera type image capture device displaying the captured image on a display thereof.

FIG. 7A is a graphical representation of one embodiment of a three reflection optical system utilizing three curved surface mirrors.

FIG. 7B is a front view of one embodiment of the optical system shown in FIG. 7A mounted on a digital camera type image capture device displaying the captured image on a display thereof.

FIG. 8A is a front view depicting one embodiment of an optical system in one configuration of dimensions appropriate for use with an iPhone® type device.

FIG. 8B is a side view of the optical system shown in FIG. 8A.

FIG. 9A is a side view of the optical system shown in FIGS. 8A, 8B.

FIG. 9B is a front view of the optical system shown in FIG. 9A.

FIG. 9C is a rear view of the optical system shown in FIG. 9A.

FIG. 15 is a bottom view of the optical system mounted on an image capture device shown in FIG. 10.

FIG. 15A is a side view of one embodiment of an optical system comprising a multidirectional (e.g., backward/forward or front/rear) looking optical system having a deviating optical element and corrective lenses.

FIG. 15B is a side view of the optical system in FIG. 15a where the deviating optical element is rotated 90°.

FIG. 15C is a top view of an image capture device comprising one embodiment of an optical system comprising a multidirectional (e.g., backward/forward or front/rear) optical system having a deviating optical element and corrective lenses where the deviating optical element is positioned in a rear facing view position.

FIG. 15D is a top view of an image capture device comprising one embodiment of an optical system comprising a multidirectional (e.g., backward/forward or front/rear) optical system having a deviating optical element and corrective lenses where the deviating optical element is positioned in a front facing view position.

FIG. 15E shows an image capture device displaying an image captured by the multidirectional (e.g., backward/forward or front/rear) optical system shown in FIG. 15C where the deviating optical element is positioned in a rear facing view position.

FIG. 15F shows an image capture device displaying an image captured by the multidirectional (e.g., backward/forward or front/rear) optical system shown in FIG. 15D where the deviating optical element is positioned in a front facing view position.

FIG. 36 is a plan view of a different embodiment of a housing non-movably mounted to an image capture device.

FIG. 37 is a side view of one embodiment of the non-movable housing shown in FIG. 36 that can be attached directly to an image capture device.

FIGS. 38A and 38B illustrate one embodiment of an image diversion system mounted to a scuba mask.

FIGS. 39A and 39B illustrate one embodiment of an image diversion system mounted to ski goggles.

FIG. 40 illustrates an image capture system configured in a photographic mode.

DETAILED DESCRIPTION

Figure 1B:
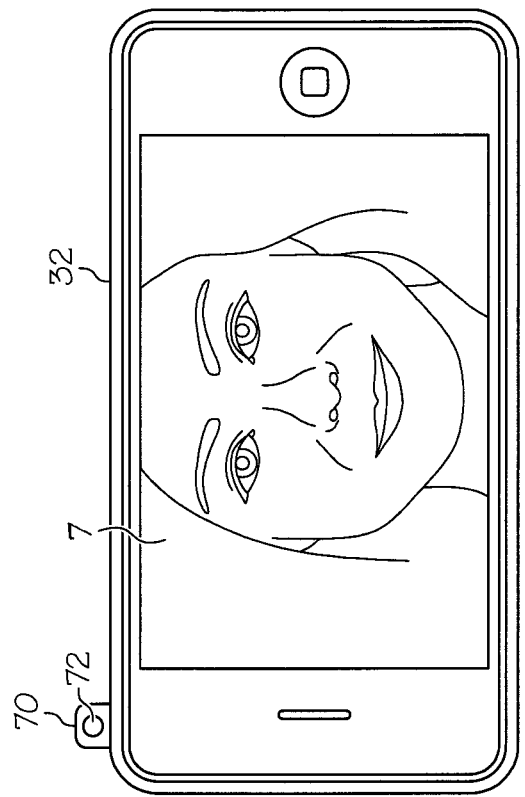
FIG. 1B is a front view of one embodiment of the optical system shown in FIG. 1A mounted on a smart phone type image capture device displaying the captured image on a display thereof.

Embodiments disclosed herein provide image diversion systems and methods for image capture devices. The systems and methods can be used to create a "look backward" device for use in, for example, taking a self-portrait or can be configured to provide a bi-directional device that can preview images that will be captured looking forward (as with a standard lens image capture device) or looking backward. Although various embodiments will be described herein, many modifications and variations to those embodiments may be implemented. For example, different types of image diversion systems disclosed herein can be used with different types of image capture devices disclose herein. Also, where certain arrangements and configurations are disclosed for certain components, other arrangements and configurations may be used without limitation. The following description and appended claims are intended to cover all such modification and variations.

The systems and methods described herein achieve these benefits by providing one or more optical elements in a housing that can attach to an image capture device. The number and positioning of the optical elements and the placement of the housing relative to the lens of the image capture device can be adjusted based on the purpose and size of a particular embodiment. For example, an embodiment that diverts an image by 180° may need more reflective surfaces than an embodiment that diverts an image by 90°. Embodiments that divert an image by 180° may require a different number of reflective and/or refractive surfaces based on different sizing constraints of the housing. Smaller housings may require more or smaller reflective surfaces. In various embodiments. In various embodiments, the one or more optical elements may comprise one or more reflective surfaces, one or more TIR elements, and/or one or more lens elements.

The described housings can be configured to mount onto preexisting image capture devices based on the size and lens placement of the preexisting device. For example, in various embodiments the housings of the image diversion systems can be configured to mount onto multi-purpose personal devices and/or mobile devices, which may comprise or be implemented as a combination of handheld digital camera and mobile telephone or smart phone such as, without limitation, an iPhone®, Blackberry®, Palm® Treo™, cell phones, as well as other types of mobile devices having image capture functionality such as a personal digital assistant (PDA), mobile telephone, combination mobile telephone/PDA, mobile unit, subscriber station, game device, messaging device, media player, pager, or any other suitable mobile device comprising in accordance with the described embodiments. In other embodiments, the image diversion systems disclosed herein may be used with and/mounted onto various digital cameras, video cameras, and/or conventional film cameras. When used with conventional film cameras, the systems and methods disclosed herein function only as an image diverter for the image capture path. When used with an image capture device having a preview screen (also referred to as a display screen herein), the disclosed systems and methods can divert the image that is captured and its representation on the preview screen. It will be appreciated by those skilled in the art, that an image can be captured for an instant (e.g., a few microseconds or milliseconds), can be stored in temporary memory (e.g., random access memory), or non-volatile memory (e.g., read only memory, flash memory, magnetic hard disk, optical disk) or temporary memory (e.g., random access memory). When used with conventional film cameras, the systems and methods disclosed herein function as an image diverter for images transmitted down the image capture path. The eye can also serve as an image capture device where the image diversion system is contained in a housing configured to mount to a pair of eyeglasses, scuba masks, ski goggles, and the like.

Embodiments disclosed herein can consist of an optical system comprising a plurality of elements arranged within a housing and a mounting device which fold and correct the image facing the display side of an image capture device and deliver the image to the lens on the other side. The mounting device can be separate from or integral with the housing. That is, the housing and the mounting device can be two separate pieces that fit or can be held together or can be one single piece.

In one application, embodiments disclosed herein can be used in self portrait, to capture ones image while viewing the preview screen. Embodiments disclosed herein can add the component needed to allow a mobile phone equipped with a digital camera to be used as a video phone. With additional software, or lenses, embodiments disclosed herein can also allow a digital image capture device with a preview screen to be used as a reflective mirror, in one non-limiting embodiment, a "magnifying" or "make-up mirror" (use of the term "make-up" should not be interpreted as limiting this application to females).

Embodiments disclosed herein can also convert a web type camera built in to a personal computer monitor into a forward looking picture camera.

Figure 1A:
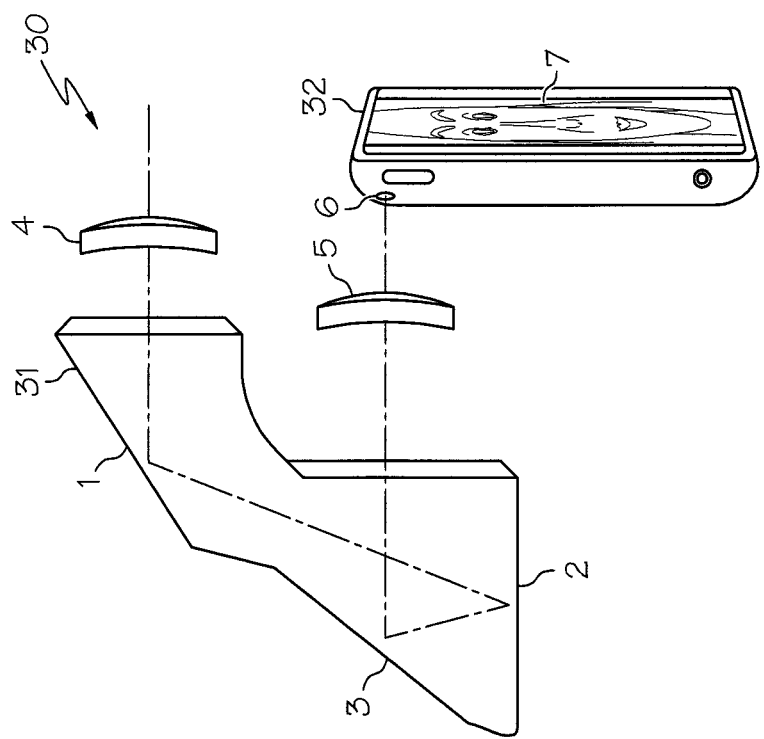
FIG. 1A is a graphical representation of one embodiment of a three reflection optical system utilizing three reflective surfaces on a prism and two corrective lens elements.

FIG. 1A illustrates schematically one embodiment of a backward looking optical system 30 (e.g., an image diversion system) comprising three reflective surfaces 1, 2, 3 on a prism 31 and two corrective lenses 4, 5. Light from an object passes through corrective lens 4 striking primary reflective surface 1. Light is reflected to intermediate surface 2 and then reflected to secondary reflective surface 3. Light then passes through corrective lens 5 and the image is centered to lens 6 of an image capture device 32. As shown in FIG. 1B, image diversion system 30 may be contained in housing 70 and the image is captured by aperture 72 in housing 70. The image is viewed on a display screen 7 of image capture device 32. In the embodiment illustrated in FIGS. 1A-B, optical system 30 is shown in use with an iPhone® type image capture device 32. In other embodiments, optical system 30 may be used with any suitable image capture device.

FIG. 1C illustrates one embodiment of optical system 30 mounted on a personal computer (PC) screen 34 equipped with an image capture device 38. Optical system 30 and image capture device 38 in the monitor allows a forward view of an image 46 from the backward facing image capture device 38. As shown in FIG. 1D, image diversion system 30 may be contained in housing 71 and the image is captured by aperture 74 in housing 71.

Figure 2B:
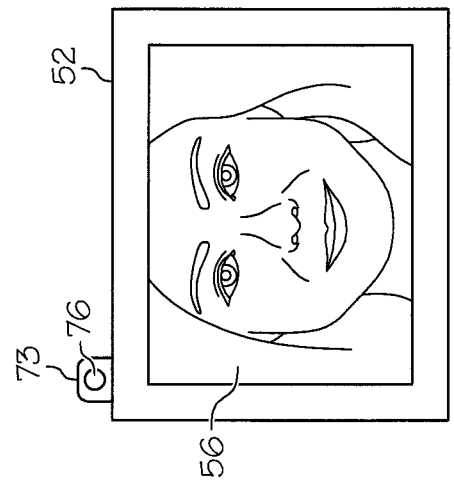
FIG. 2B is a front view of one embodiment of one embodiment of the optical system shown in FIG. 2A mounted on a digital camera type image capture device displaying the captured image on a display thereof.
Figure 2A:
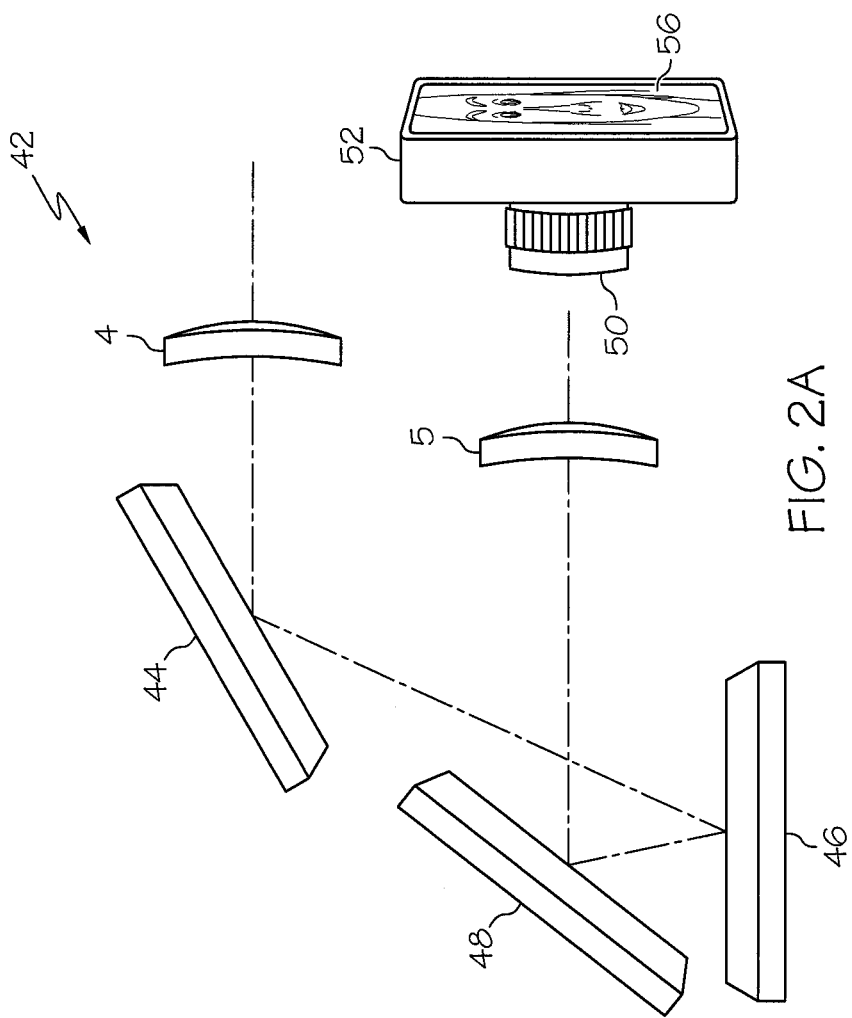
FIG. 2A is a graphical representation of one embodiment of a three reflection optical system utilizing three flat mirrors and two corrective lens elements.

FIG. 2A illustrates schematically one embodiment of a backward looking optical system 42 (e.g., image diversion system) comprising three plane mirrors 44, 46, 48 and two corrective lenses 4, 5. Light from an object passes through corrective lens 4 striking a primary reflective surface 44. Light is reflected to intermediate surface 46 and then reflected to secondary reflective surface 48. Light then reflects through corrective lens 5 and the image is centered to lens 50 of an image capture device 52. As shown in FIG. 2B, image diversion system 42 may be contained in housing 73 and the image is captured by aperture 76 in housing 73. The image is viewed on a display screen 56 of image capture device 52. In the embodiment illustrated in FIGS. 2A-B, optical system 42 is shown in use with a digital camera type image capture device 52. In other embodiments, optical system 42 may be used with any suitable image capture device.

FIG. 3A illustrates schematically one embodiment of a backward looking optical system 58 (e.g., image diversion system) comprising a shaped fiber optic bundle 8, an inverting lens 9, a corrective lens 10, and a magnifying lens 11. Light from an object passes through inverting lens 9 and corrective lens 10. Light enters fiber optic bundle 8 and exits to magnifying lens 11 and the image is centered to lens 50 of an image capture device 52. As shown in FIG. 3B, image diversion system 58 may be contained in housing 73 and the image is captured by aperture 76 in housing 73. The image is viewed on display screen 56 of image capture device 52. In the embodiment illustrated in FIGS. 3A-B, optical system 58 is shown in use with a digital camera type image capture device 52. In other embodiments, optical system 58 may be used with any suitable image capture device.

Figure 4B:
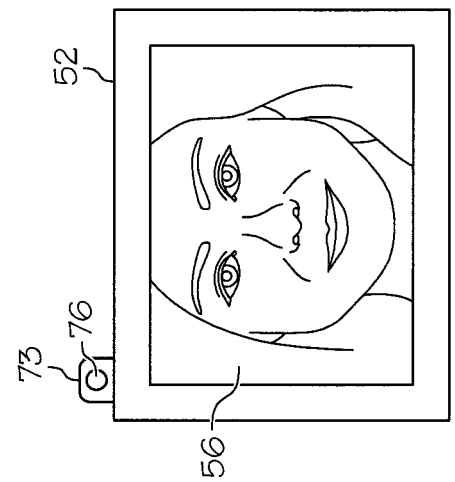
FIG. 4B is a front view of one embodiment of the optical system shown in FIG. 4A mounted on a digital camera type image capture device displaying the captured image on a display thereof.
Figure 4A:
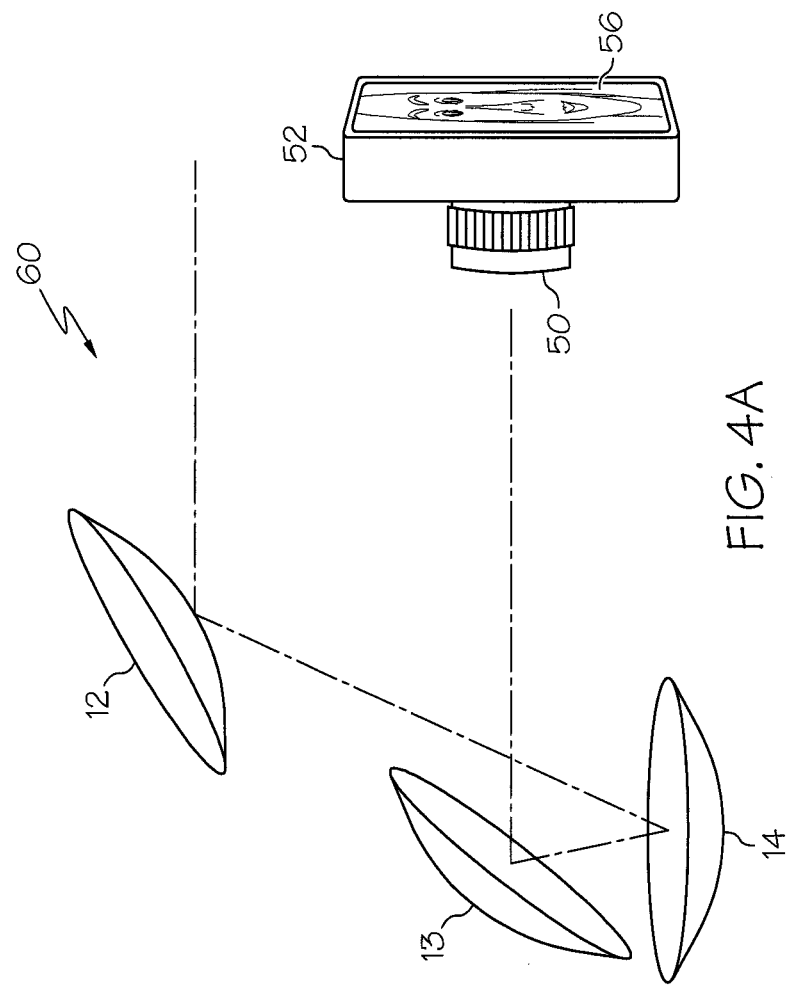
FIG. 4A is a graphical representation of one embodiment of a three reflection optical system utilizing three curved surface mirrors.

FIG. 4A illustrates schematically one embodiment of a backward looking optical system 60 (e.g., image diversion system) comprising three curved mirrors 12, 13, 14. Light from an image is reflected on convex mirror 12 to intermediate concave mirror 14 to secondary concave mirror 13 and the image is centered to lens 50 of an image capture device 52. As shown in FIG. 4B, image diversion system 60 may be contained in housing 73 and the image is captured by aperture 76 in housing 73. The image is viewed on a display screen 56 of image capture device 52. In the embodiment illustrated in FIGS. 4A-B, optical system 60 is shown in use with a digital camera type image capture device 52. In other embodiments, optical system 60 may be used with any suitable image capture device.

FIGS. 5A-B, 6A-B, and 7A-B are similar devices with slightly different light paths and reflective surfaces all of which can be used in accordance with the disclosed embodiments.

Figure 5B:
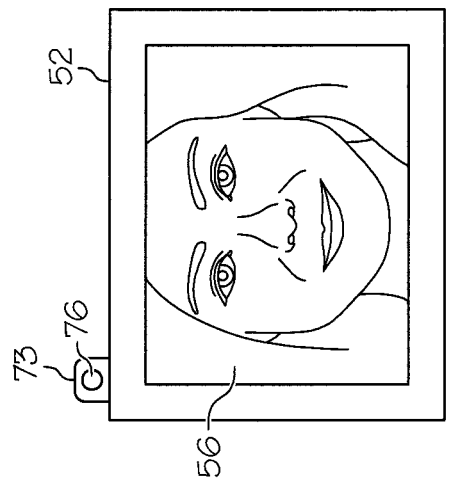
FIG. 5B is a front view of one embodiment of the optical system shown in FIG. 5A mounted on a digital camera type image capture device displaying the captured image on a display thereof.
Figure 5A:
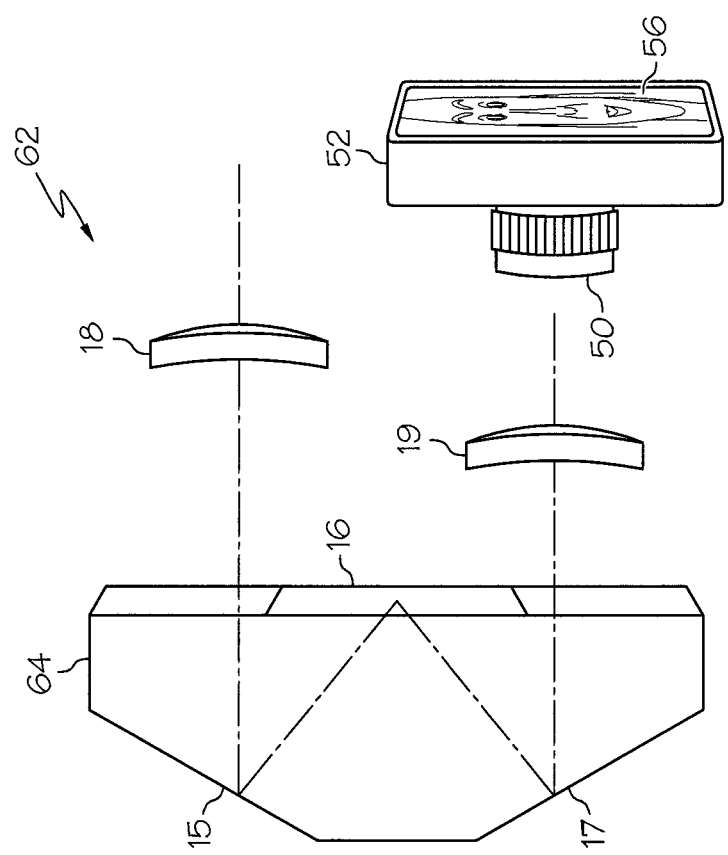
FIG. 5A is a graphical representation of one embodiment of a three reflection optical system utilizing three reflective surfaces on a prism and corrective lens elements.

FIG. 5A illustrates schematically one embodiment of a backward looking optical system 62 (e.g., image diversion system) comprising three reflective surfaces 15, 16, 17 on a prism 64 and two corrective lenses 18, 19. Light from an object passes through corrective lens 18 striking primary reflective surface 15. Light is reflected to intermediate surface 16 and then reflected to secondary reflective surface 17. Light then reflects through corrective lens 19 and the image is centered to lens 50 of an image capture device 52. As shown in FIG. 5B, image diversion system 62 may be contained in housing 73 and the image is captured by aperture 76 in housing 73. The image is viewed on a display screen 56 of image capture device 52. In the embodiment illustrated in FIGS. 5A-B, optical system 62 is shown in use with a digital camera type image capture device 52. In other embodiments, optical system 62 may be used with any suitable image capture device.

Figure 6B:
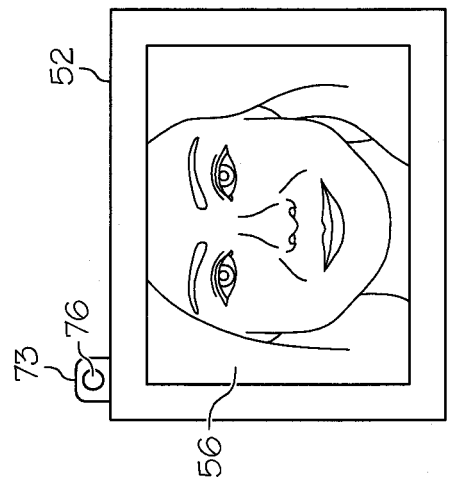
FIG. 6B is a front view of one embodiment of the optical system shown in FIG. 6A mounted on a digital camera type image capture device displaying the captured image on a display thereof.
Figure 6A:
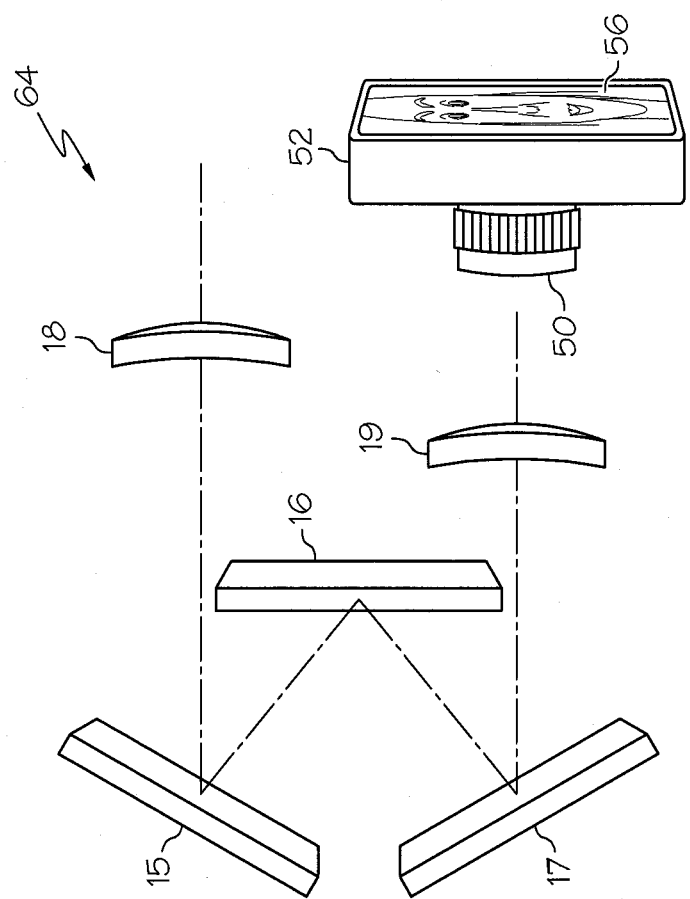
FIG. 6A is a graphical representation of one embodiment of a three reflection optical system utilizing three flat mirrors and two corrective lens elements.

FIG. 6A illustrates schematically one embodiment of a backward looking optical system 64 (e.g., image diversion system) comprising three plane mirrors 15, 16, 17 and two corrective lenses 18, 19. Light from an object passes through corrective lens 18 striking a primary reflective surface 15. Light is reflected to intermediate surface 16 and then reflected to secondary reflective surface 17. Light then reflects through corrective lens 19 and the image is centered to lens 50 of an image capture device 52. As shown in FIG. 6B, image diversion system 64 may be contained in housing 73 and the image is captured by aperture 76 in housing 73. The image is viewed on a display screen 56 of image capture device 52. In the embodiment illustrated in FIGS. 6A-B, optical system 64 is shown in use with a digital camera type image capture device 52. In other embodiments, optical system 64 may be used with any suitable image capture device.

FIG. 7A illustrates schematically one embodiment of a backward looking optical system 66 (e.g., image diversion system) comprising three curved mirrors 20, 21, 22. Light from an image is reflected on convex mirror 20 to intermediate concave mirror 21 to secondary concave mirror 22 and the image is centered to lens 50 of an image capture device 52. As shown in FIG. 7B, image diversion system 66 may be contained in housing 73 and the image is captured by aperture 76 in housing 73. The image is viewed on a display screen 56 of image capture device 52. In the embodiment illustrated in FIGS. 7A-B, optical system 66 is shown in use with a digital camera type image capture device 52. In other embodiments, optical system 66 may be used with any suitable image capture device.

As should be understood by the foregoing description, any type of appropriate reflective surface can be used to achieve the image diversions described herein. Lenses can be single element lenses or compound lenses consisting of a multiplicity of lenses as appropriate for a particular design. The housing and mounting means can also be manufactured using any appropriate materials and in the appropriate dimensions to be easily attachable to numerous commercially available devices.

In certain embodiments the housings will be light and sized so that the size of the commercially available image capture device is not unduly enlarged. Accordingly, and as will be understood by one of ordinary skill in the art, reflective components can be smaller and positioned more closely together such that the housing that contains them does not unduly enlarge the size of the image capture device. For instance, in some embodiments the device may only add a few centimeters to two dimensions of an image capture device. In particular embodiments, these enlarged dimensions will be the height and width of the device, but not the length. Additionally, if dimensions of an image device are affected, the housing need not affect the whole of that dimension along its entirety but may only affect a portion of it. Alternatively, the housing could affect the entirety of a dimension or could even encase the entirety of an image capture device.

FIGS. 8A and 8B illustrate one embodiment of an image capture device 32 that incorporates a backward looking optical system 64 (e.g., image diversion system) comprising three plane mirrors 15, 16, 17 and two corrective lenses 18, 19 (corrective lens 19 not shown in FIG. 8B) shown in FIG. 6A contained in a housing 70. FIG. 8A is a front view of device 32 with Page of housing 70 containing backward optical system 64 attached thereto and FIG. 8B is a side view. As can be seen in FIG. 8A, when viewed from the front, the depicted embodiment only adds a small protrusion from the top of the iPhone® type image capture device 32. In other embodiments, this protrusion could be rounded and/or extended and/or sloped depending on the visual and tactile features desired for the particular embodiment. When viewed from the side as shown in FIG. 8B, this depicted embodiment adds to the width of the image capture device 32 near the top of the device. This protrusion can also be rounded and/or extended and/or sloped depending on the visual and tactile features desired for the particular embodiment. As shown in the embodiment illustrated in FIGS. 8A-B, housing 70 is attached to a housing portion of an iPhone® type image capture device 32 and is positioned over the camera lens of image capture device 32. The image is captured by aperture 72 in housing 70. FIGS. 8A-B show one potential size of a backward looking optical system 64 contained in a housing 70 sized appropriately for use with an iPhone® type image capture device 32.

FIGS. 9A, 9B, and 9C illustrate a side view, front view, and rear view, respectively, of a housing 70 containing a backward looking optical system 64 (e.g., image diversion system) shown in FIGS. 8A-B.

Figure 10:
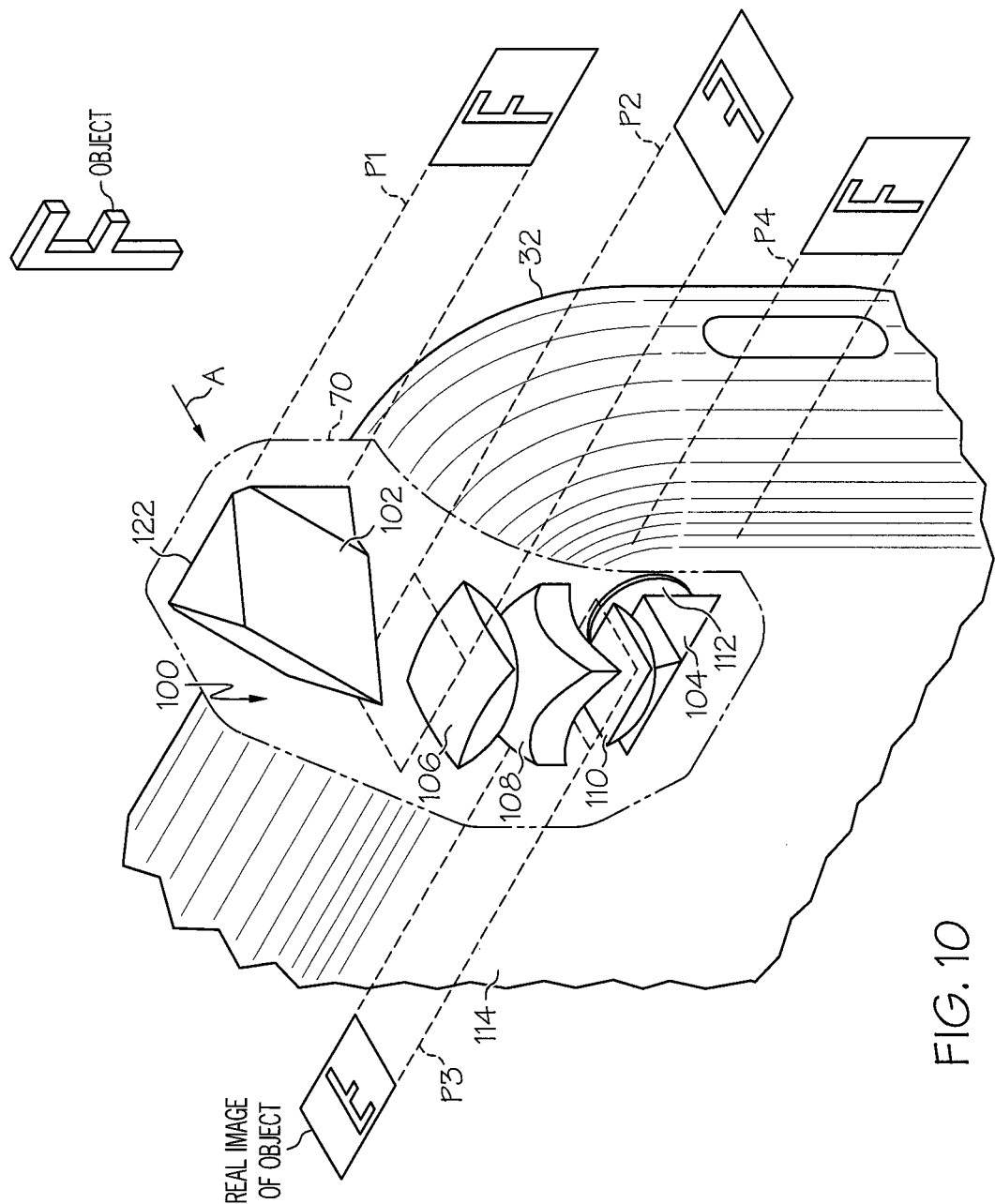
FIG. 10 is perspective view of one embodiment of an optical system comprising one embodiment of a backward looking optical system having a first deviating optical element, a second deviating optical element, and corrective lenses contained within a housing mounted on an image capture device.

FIGS. 10-15 illustrate one embodiment of a backward looking optical system 100 (e.g., image diversion system)

comprising a first deviating optical element 102, a second deviating optical element 104, and corrective lenses 106, 108, 110, 112 contained within a housing 70. Housing 70 is attached to a housing portion 114 of an image capture device 32. In this configuration the image capture device (e.g., camera) and the display (e.g., screen) see a mirror image of the object "F." To aid the understanding of the operation of image diversion system 100, reference is also made to FIG. 42, which illustrates an image capture system configured in a diversion mode. Light from an object "F" enters input surface 122 in the direction indicated by arrow A of first deviating optical element 102. An image of the object "F" at the input of deviating optical element 102 at plane P1. Light then passes through corrective lenses 106 and 108 and the image appears at plane P3 as shown in FIG. 10. As is well known to those skilled in the art, the image at plane P3 may now be referred to as a "real image" or an "intermediate image" of the object "F." Light then passes through corrective lens 110 and through second deviating optical element 104. At the output of second deviating optical element 104 at plane P4 the image capture device and the display screen see a backward, e.g., mirror image, of the object "F." The virtual image that appears at the output (e.g., exit) aperture of image diversion system 100 at plane P4 has a wide field of view. The field of view of the virtual image appearing at the output aperture is at least 10° but preferably greater than 40°, and most preferably at least 50°. Second deviating lens 104 deviates the light by another 90°. Accordingly, the image appears centered to lens 116 of image capture device 32 deviated by a total of 180° relative to the original image of the object "F" that enters input surface 122. Thus, the image is transferred through image diversion system 100 illustrated passively and agnostically without any software manipulation of the digitally captured image. The captured image may be reoriented using well known software manipulation techniques.

Figure 13:
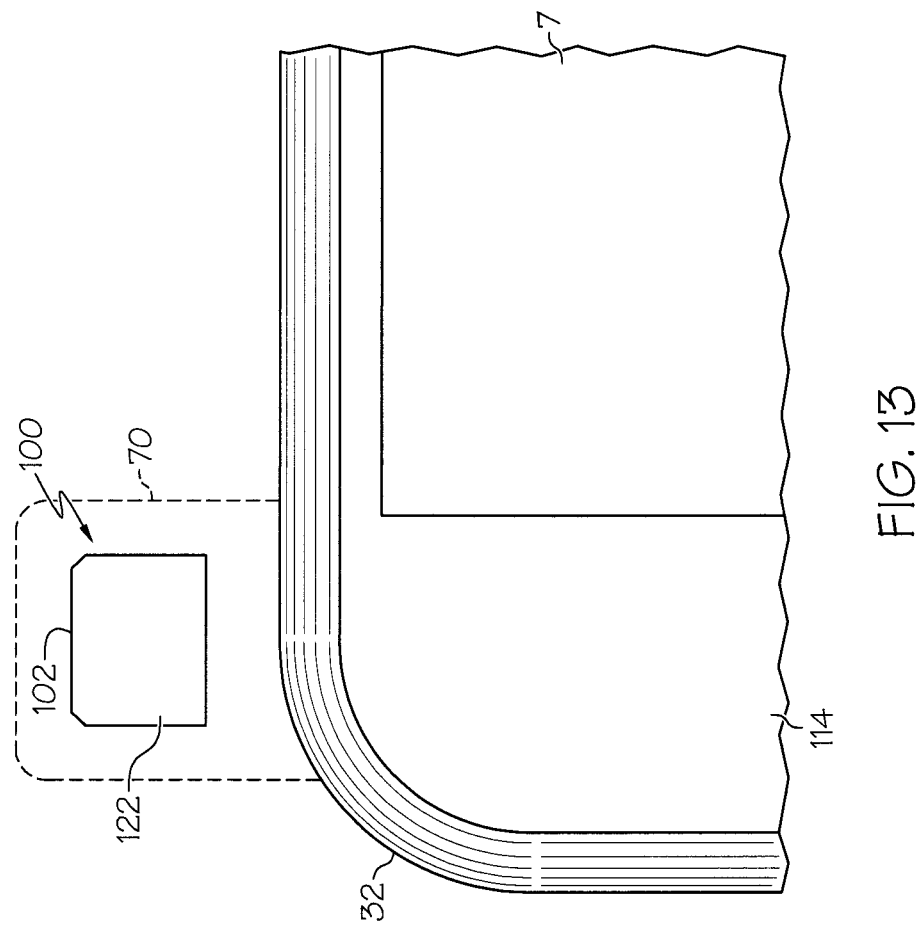
FIG. 13 is a front view of the optical system mounted on an image capture device shown in FIG. 10.
Figure 14:
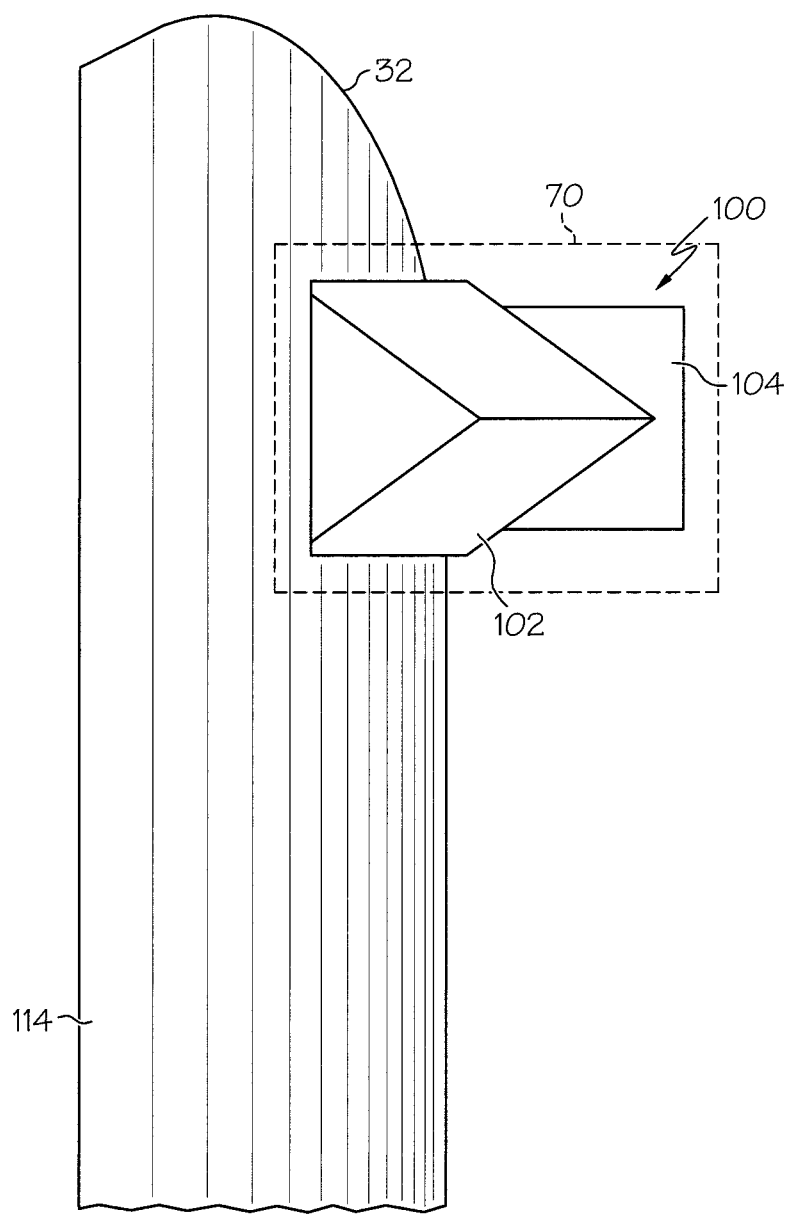
FIG. 14 is a top view of the optical system mounted on an image capture device shown in FIG. 10.
Figure 16:
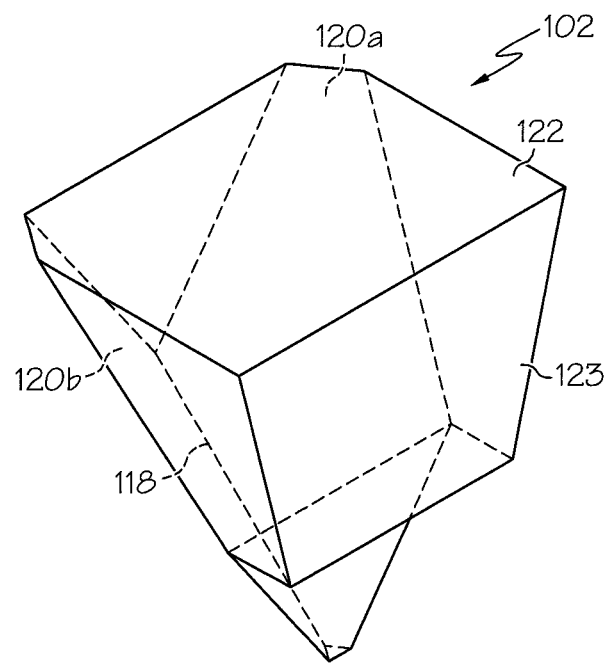
FIG. 16 is a perspective view of one embodiment of a roof prism type deviating optical element.
Figure 17:
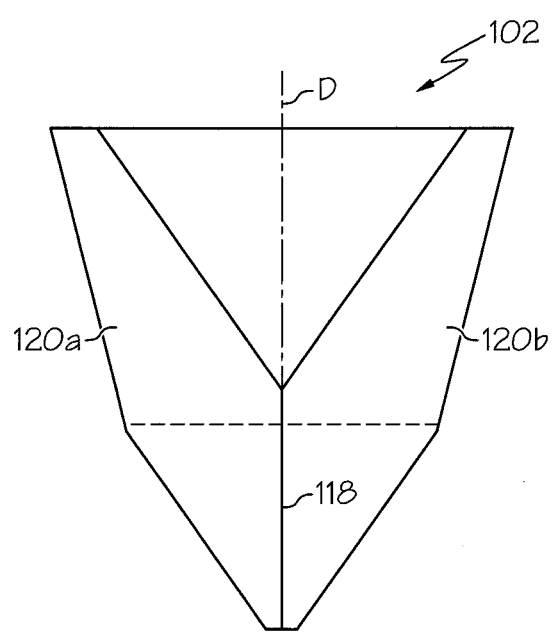
FIG. 17 is a rear view of the roof prism type deviating optical element shown in FIG. 16.
Figure 18:
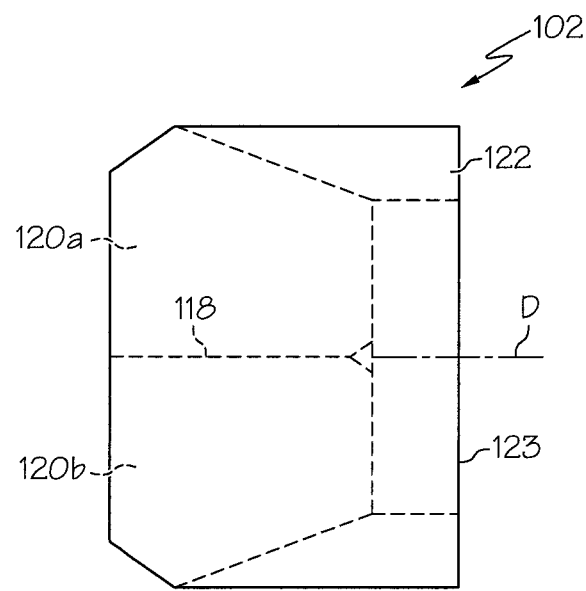
FIG. 18 is a top view of the roof prism type deviating optical element shown in FIG. 16.
Figure 19:
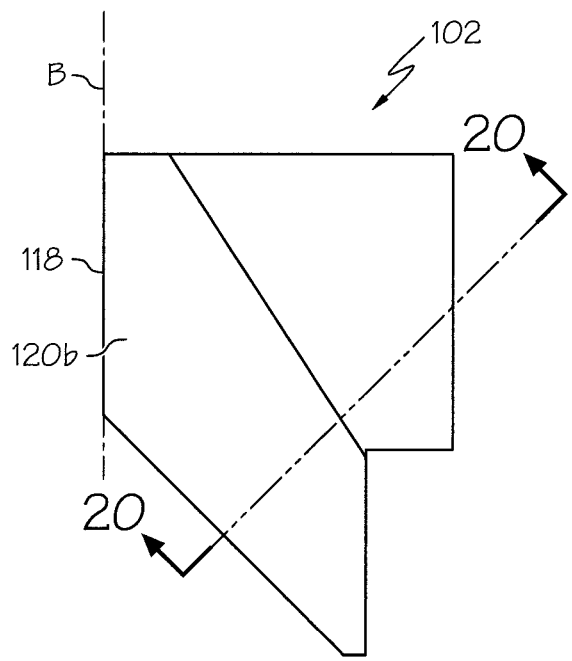
FIG. 19 is a side view of the roof prism type deviating optical element shown in FIG. 16.
Figure 20:
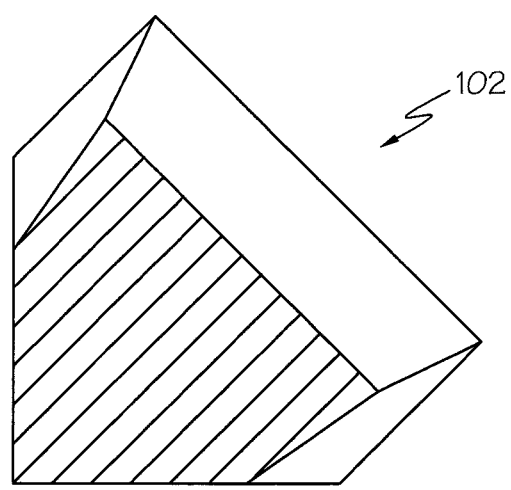
FIG. 20 is a section view taken along line 20-20 shown in FIG. 19 of the roof prism type deviating optical element shown in FIG. 16.

In the embodiment illustrated in FIGS. 10-15, first deviating optical element 102 is a roof prism and second deviating optical element 104 is a standard right-angled prism (both described in more detail below). Also, in the embodiment illustrated in FIGS. 10-15 corrective lens 106 is a convex lens, lens 108 is a positive meniscus lens, lens 110 is a plano-convex lens, and lens 112 is a biconvex lens. It will be appreciated that other combinations of deviating optical elements, corrective lenses, and inverting lenses may be employed without limitation. Therefore, the embodiment illustrated in FIGS. 10-15 should not be limited in this context. The image is viewed on a display screen 7 of image capture device 32, as shown in FIG. 13. In the embodiment illustrated in FIGS. 10-15, optical system 100 is shown in use with an iPhone® type image capture device. In other embodiments, optical system 100 may be used with any suitable image capture device.

FIGS. 15A and 15B illustrate one embodiment of a multi-directional (e.g., forward/backward or front/rear) looking optical system 900 (e.g., image diversion system) comprising a deviating optical element 904, and corrective lenses 906, 908, 910, 912, 926, 928, 930. A first set of corrective lenses 942 comprises corrective lenses 906, 908, 910 to receive light from an object that enters optical system 900 in the direction indicated by arrow A and passes through first set of corrective lenses 942 as shown in FIG. 15A. A second set of corrective lenses 944 comprises corrective lenses 926, 928, 930 to receive light from an object that enters optical system 900 in the direction indicated by arrow B and passes through second set of corrective lenses 944 as shown in FIG. 15B.

In the embodiment illustrated in FIGS. 15A and 15B, deviating optical element 904 is a standard right-angled prism. Also, in the embodiment illustrated in FIGS. 15A and 15B corrective lens 906 is a convex lens, lens 908 is a positive meniscus lens, lens 910 is a plano-convex lens, lens 912 is a biconvex lens, corrective lens 926 is a convex lens, lens 928 is a positive meniscus lens, and lens 930 is a plano-convex lens. It will be appreciated that other combinations of deviating optical elements, corrective lenses, and inverting lenses may be employed without limitation. Therefore, the embodiment illustrated in FIGS. 15A and 15B should not be limited in this context.

FIG. 15A illustrates an optical system 900 providing a first view to the image capture device that is 180° opposite from a second view to the image capture device that is shown in FIG. 15B. The only variation between FIG. 15A and FIG. 15B is the orientation of deviating optical element 904. In one embodiment, deviating optical element 904 is rotatably positionable in a first position to provide a first view (e.g., rear facing view) to an imager of the image capture device and in a second position to provide a second view (e.g., front facing view) to the imager. Deviating optical element 904 may be rotated between the first and second positions in any suitable manner including, for example, manually, automatically, by a motor, by a spring mechanism. In another embodiment, it will be appreciated that deviating optical element 904 could be replaced with a beam splitter providing a simultaneous view in two directions to the imager of the image capture device.

FIG. 15C is a top view of an image capture device 940 comprising one embodiment of an optical system 900 for collecting images from the user side of image capture device 940 (e.g., camera/phone). In one embodiment, optical system 900 comprises a multidirectional (e.g., backward/forward or front/rear) optical system having deviating optical element 904 and first set of corrective lenses 942 where deviating optical element 904 is positioned in a rear facing view position. In the embodiment illustrated in FIG. 15C, deviating optical element 904 is located in a first position (rear facing view). Accordingly, light from object 948 (here, the user of the image capture device 940) enters optical system 900 in the direction indicated by arrow A and passes through first set of corrective lenses 942 (e.g., rear view lenses comprising corrective lenses 906, 908, 910 shown in FIG. 15A). The light emerging from corrective lenses 942 is then reflected by the deviating optical element 904. Imager 946 collects an image 952 of object 948 through corrective lens 912. Image 952 of object 948 is then presented to the user side display screen of image capture device 940 as shown in FIG. 15E.

FIG. 15D is a top view of image capture device 940 shown in FIG. 15C comprising one embodiment of optical system 900 for collecting images from the opposite side of the user side of image capture device 940 (e.g., camera/phone). In one embodiment, optical system 900 comprises multidirectional (e.g., backward/forward or front/rear) optical system having deviating optical element 904 and second set of corrective lenses 944 where the deviating optical element 904 is positioned in a front facing view position. In the embodiment illustrated in FIG. 15D, deviating optical element 904 is located in a second position (front facing view). Accordingly, light from object 950 (here, a scene) enters optical system 900 in the direction indicated by arrow B and passes through second set of corrective lenses 944 (e.g., front view lenses comprising corrective lenses 926, 928, 930 shown in FIG. 15B). The light emerging from corrective lenses 944 is then reflected by deviating optical element 904. Imager 946 collects an image 954 of object 950 through corrective lens 912. Image 954 of object 950 is then presented to the user side display screen of image capture device 940 as shown in FIG. 15F.

FIGS. 16-20 illustrate one embodiment of first deviating optical element 102 implemented as a roof prism for use in backward looking optical system 100. In one embodiment, roof prism 102 (also referred to as a Dach prism) comprises a "roof" section 118 where two roof faces 120a, 120b meet at a 90° angle to provide reflective optical surfaces. In one embodiment, roof prism 102 may be shaped like a standard right-angled prism with an additional totally internally reflecting (TIR) roof section 118 consisting of two roof faces 120a, 120b meeting at a 90° angle on the longest side. Roof prism 102 inverts an image entering input surface 122 (e.g., aperture) and also deflects the image 90° as it exits output surface 123. Total internal reflection from roof faces 120a, 120b inverts an image entering aperture surface 122 across axis D where roof faces 120a, 120b meet and simultaneously deviates the image by 90° as it exits output surface 123. As used throughout this specification, image "inversion" refers to flipping the image about a horizontal axis and image "reversion" refers to flipping the image a vertical axis. An inverted image will appear "upside-down" whereas a reverted image will appear backwards. An inversion plus a reversion is equivalent to a 180° image rotation with no parity change. Roof prism 102 may be made of glass, acrylic, liquid, crystal, polymer, or any suitable optical medium that is transparent to any wavelengths at which the images occur. In one embodiment, roof faces 120a, 120b can be coated to provide reflective mirror surfaces. This would allow roof prism 102 to be used with a wider range of light beam entrance angles through aperture 122 without being limited by total internal reflection. In another embodiment, element 102 can be replaced with two reflective surfaces located in place of faces 102a, 102b, e.g., positioned at 90° relative to each other to reflect light entering aperture 122 in a manner similar to roof prism 102.

Figure 21:
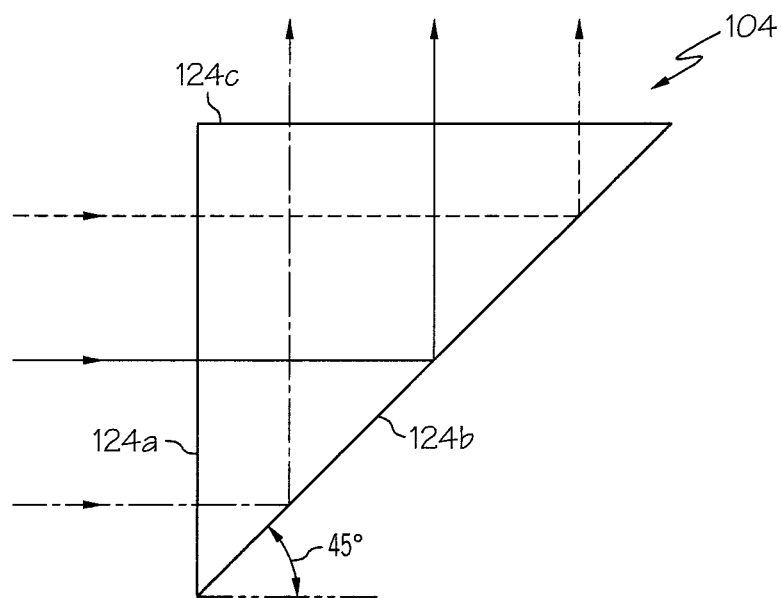
FIG. 21 is a side view of a right-angled prism type deviating optical element.
Figure 22:
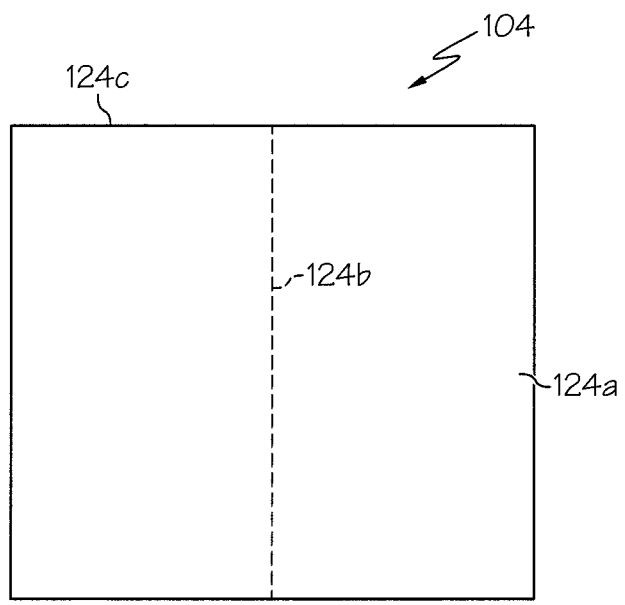
FIG. 22 is another view of the right-angled prism type deviating optical element shown in FIG. 21.

FIGS. 21 and 22 illustrate one embodiment of a second deviating optical element 104 implemented as a standard right-angled prism. In one embodiment, prism 104 comprises a transparent optical element with flat, polished surfaces 124a, 124b, 124c. In the embodiment illustrated in FIGS. 21 and 22, surfaces 124 are square, but can be rectangular or any suitable geometric shape. In operation, light enters the large rectangular face of surface 124a of prism 104, undergoes total internal reflection at hypotenuse surface 124b, and exits again through large rectangular face 124c. Because the light exits and enters prism 104 at normal incidence, prism 104 does not cause substantial dispersion. Accordingly, prism 104 is essentially used as a mirror to deviate light through 90° by total internal reflection rather than spectral reflection. An image entering input surface 124a emerges through output surface 124c erected along vertical axis V and reversed along horizontal axis H. Other types of optical prisms may be employed without limitation. Prism 104 may be made of glass, acrylic, or any material that is transparent to the wavelengths for which they are designed. In one embodiment, surface 124b may be coated with a reflective coating to provide a reflective mirror surface. In another embodiment, second deviating optical element 104 may be replaced with a mirror located at a 45° angle relative to the light path.

Figure 11:
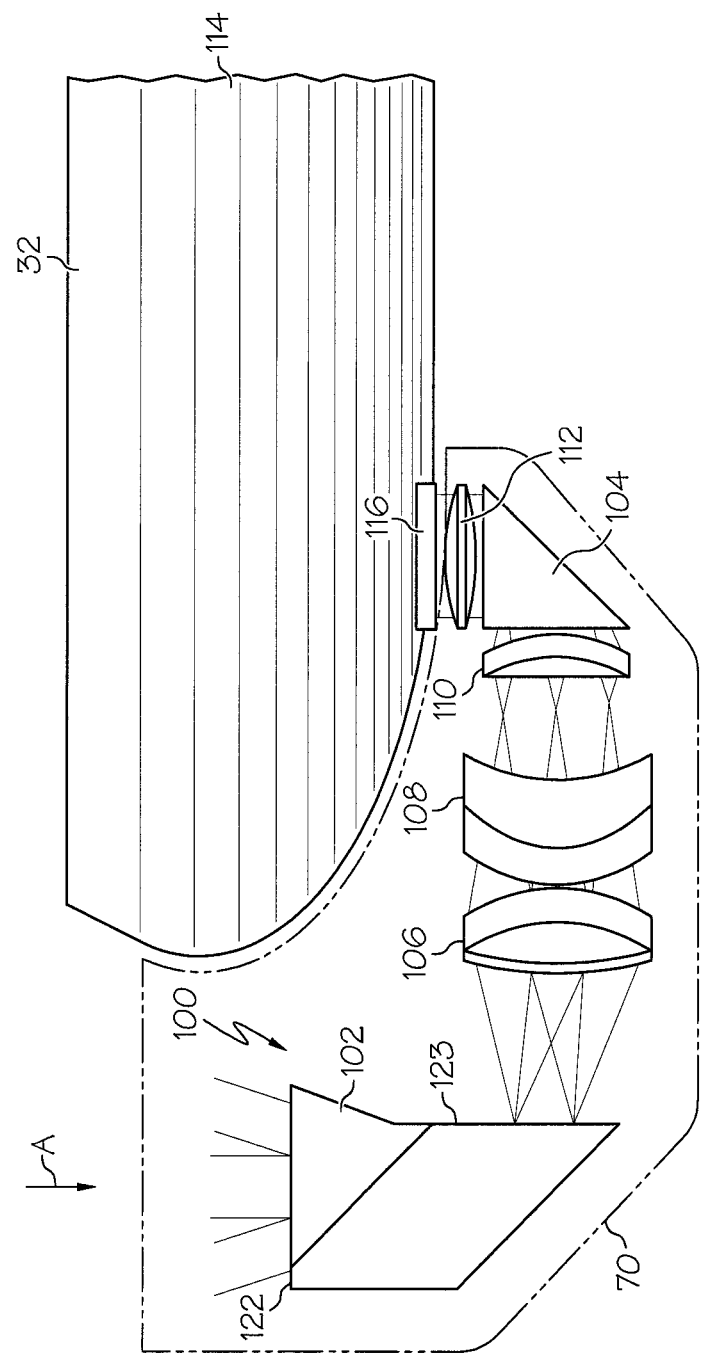
FIG. 11 is a side view of the optical system mounted on an image capture device shown in FIG. 10.
Figure 12:
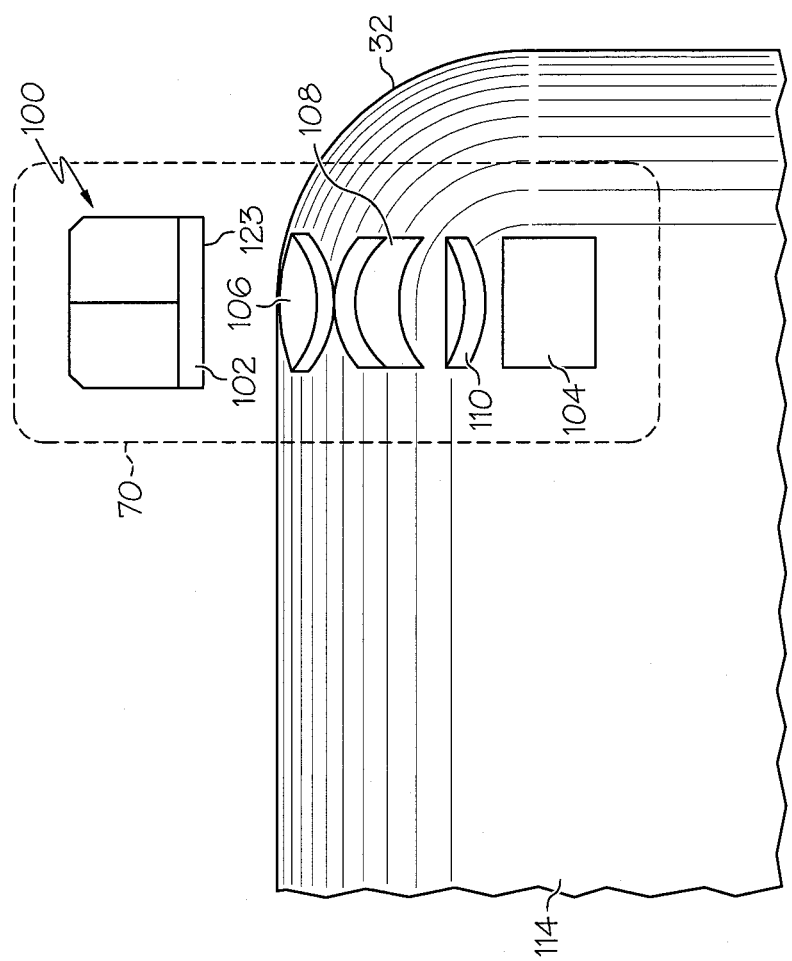
FIG. 12 is a rear view of the optical system mounted on an image capture device shown in FIG. 10.
Figure 23:
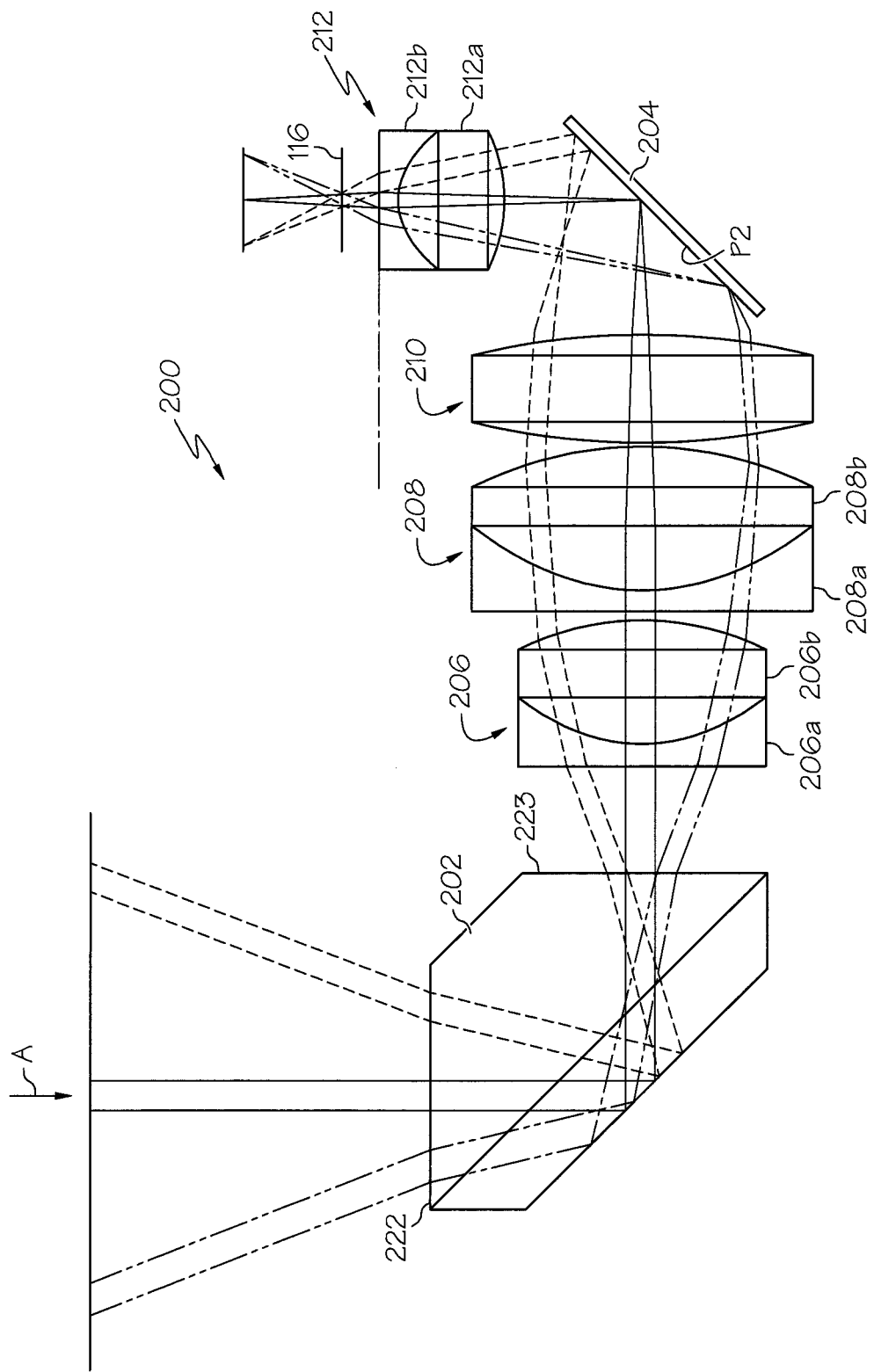
FIG. 23 illustrates one embodiment of an optical system comprising a first deviating optical element, a second deviating optical element, and corrective lenses.

FIG. 23 illustrates one embodiment of a backward looking optical system 200 (e.g., image diversion system) comprising a first deviating optical element 202, a second deviating optical element 204, and corrective lenses 206, 208, 210, 212. The backward looking optical system 200 is contained within a housing that is attachable to a housing portion of an image capture device (not shown). Light from an object enters input surface 222 in the direction indicated by arrow A of first deviating optical element 202 and passes through corrective lenses 206, 208, and 210. Light reflects from second deviating optical element 204, passes through lens 212, and the image is centered to lens 116 of image capture device 32 (FIG. 11). In the embodiment illustrated in FIG. 23, first deviating optical element 202 is a roof prism and second deviating optical element 204 is a mirror oriented at 45° relative to the path of the light. Also, in the embodiment illustrated in FIG. 23 corrective lens 206 is a compound lens formed of plano-concave lens 206a optically coupled to plano-convex lens 206b, lens 208 also is a compound lens formed of plano-concave lens 208a optically coupled to plano-convex lens 208b, and lens 210 is a biconvex lens. Lens 212 is a compound lens formed of a plano-convex lens 212a optically coupled to plano-concave lens 212b. It will be appreciated that other combinations of deviating optical elements, corrective lenses, and inverting lenses may be employed without limitation. Therefore, the embodiment illustrated in FIG. 23 should not be limited in this context. As previously described with reference to FIGS. 10-15, the image that enters lens 116 of image capture device 32 (not shown) is viewed on a display screen 7 (not shown) thereof.

In the configuration illustrated in FIG. 23, the image capture device (e.g., camera) and the display (e.g., screen) see a mirror image of the object "F." The operation of image diversion system 200 is essentially similar to the operation of image diversion system 100 illustrated in FIG. 10. To aid the understanding of the operation of image diversion system 200, reference is also made to FIG. 42, which illustrates an image capture system configured in a diversion mode. Light from an object positioned in a particular orientation along vertical and horizontal axes enters input surface 222 of roof prism 202. As the light passes through roof prism 202, it is deviated by 90° as it emerges from output surface 223. As the light passes through corrective lenses 206, 208, and 210, an intermediate real image is created at plane P2 of mirror 204. Light reflected from mirror 204 emerges deviated by another 90° and passes through corrective lens 212. At the output of corrective lens 212, the image capture device and the display screen see a backward version e.g., a mirror image, of the object. The mirror image appears centered to lens 116 of image capture device 32 (not shown) and is deviated by a total of 180° relative to the original image of the object that enters input surface 222. Thus, the image is transferred through image diversion system 200 passively and agnostically without any software manipulation of the digitally captured image. The orientation of the captured image may be manipulated using well known software techniques. A virtual image appears at the output (e.g., exit) aperture of lens 212 of image diversion system 200 having a wide field of view. The field of view of the virtual image appearing at the output aperture is at least 10° but preferably greater than 40°, and most preferably at least 50°.

TABLE 1 provides surface data summary specifications for the implementation of one embodiment of the image diversion system 200 illustrated in FIG. 23. All dimensions listed in TABLE 1 are in millimeters (mm).

| Surf | Radius | Thickness | Glass | Diameter | Comment |
|---|---|---|---|---|---|
| 0 | | | BK7 | | AMICI Roof Prism [202] 8 mm C.A. |
| 1 | | 3.9 | | 8 | Exit face of Prism [223] |
| 2 | 73.86 | 1.15 | SF10 | 9 | Lens 1.1 [206] |
| 3 | 7.38 | 4.32 | BAFN10 | 9 | Lens 1.2 [206] |
| 4 | −12.37 | 0 | | 9 | Lens 1.3 [206] |
| 5 | | 0 | | 9.4 | Spacer |

-continued

| Surf | Radius | Thickness | Glass | Diameter | Comment |
|---|---|---|---|---|---|
| 6 | 76.14 | 1.1 | SF10 | 12.5 | Lens 2.1 [208] |
| 7 | 9.35 | 5.25 | BAFN11 | 12.5 | Lens 2.2 [208] |
| 8 | −13.98 | 0 | | 12.5 | Lens 2.3 [208] |
| 9 | | 0 | | 10.3 | Spacer |
| 10 | 24.4 | 4 | K5 | 12 | Lens 3.1 [210] |
| 11 | −24.4 | 0 | | 12 | Lens 3.2 [210] |
| 12 | | 5 | | 9.2 | Spacer |
| 13 | | 0 | | | 90° Fold |
| 14 | | 0 | MIRROR | 12.5 | Mirror [204] |
| 15 | | −5 | | | 90° Fold |
| 16 | −5.56 | −3.72 | BAFN10 | 5 | Lens 4.1 [212] |
| 17 | 3.09 | −1.03 | SF10 | 5 | Lens 4.2 [212] |
| 18 | 18.25 | 0 | | 5 | Lens 4.3 [212] |
| 19 | | −1 | | 2.15 | Spacer |
| 20 | | | | 1.2 | Exit Aperture [116] |

TABLE 1 provides surface data summary specifications for the implementation of one embodiment of the image diversion The embodiments of image diversion systems 100, 200 illustrated in FIGS. 10-22 and FIG. 23, respectively, may be employed in a method for controlling parity of an image. In one embodiment, the image diversion system has an input aperture and an output aperture. An image of an object is received at the input aperture of the image diversion system. The input image has a parity about vertical and horizontal axes relative to the input aperture. The image of the object is provided to the output aperture with a parity similar to the parity of the input image about at least one axis. In one embodiment, the image diversion system is adapted to mount onto an existing image capture device having an input aperture. The output image is provided to the input aperture of the image capture device with a parity that is similar to the parity of the input image about at least one axis.

As previously discussed, the input image is diverted within the image diversion system by at least one reflective surface to form an intermediate image of the object. The intermediate image being formed along an optical path defined within the image diversion system between the input and the output apertures of the image diversion system. In one embodiment, the image provided to the output aperture has full parity about the horizontal axis and about the vertical axis relative to the input image.

In one embodiment, the image is diverted with at least one prism. In one embodiment, the prism is a roof prism, which simultaneously reflects and inverts the image. In various embodiments, the output image provided to the output aperture of the image has a field of view of at least 10° but preferably greater than 40°, and most preferably at least 50°. In various embodiments, the input image can be received by the image diversion system from the top, bottom, or either side relative to the input aperture.

Figure 23A:
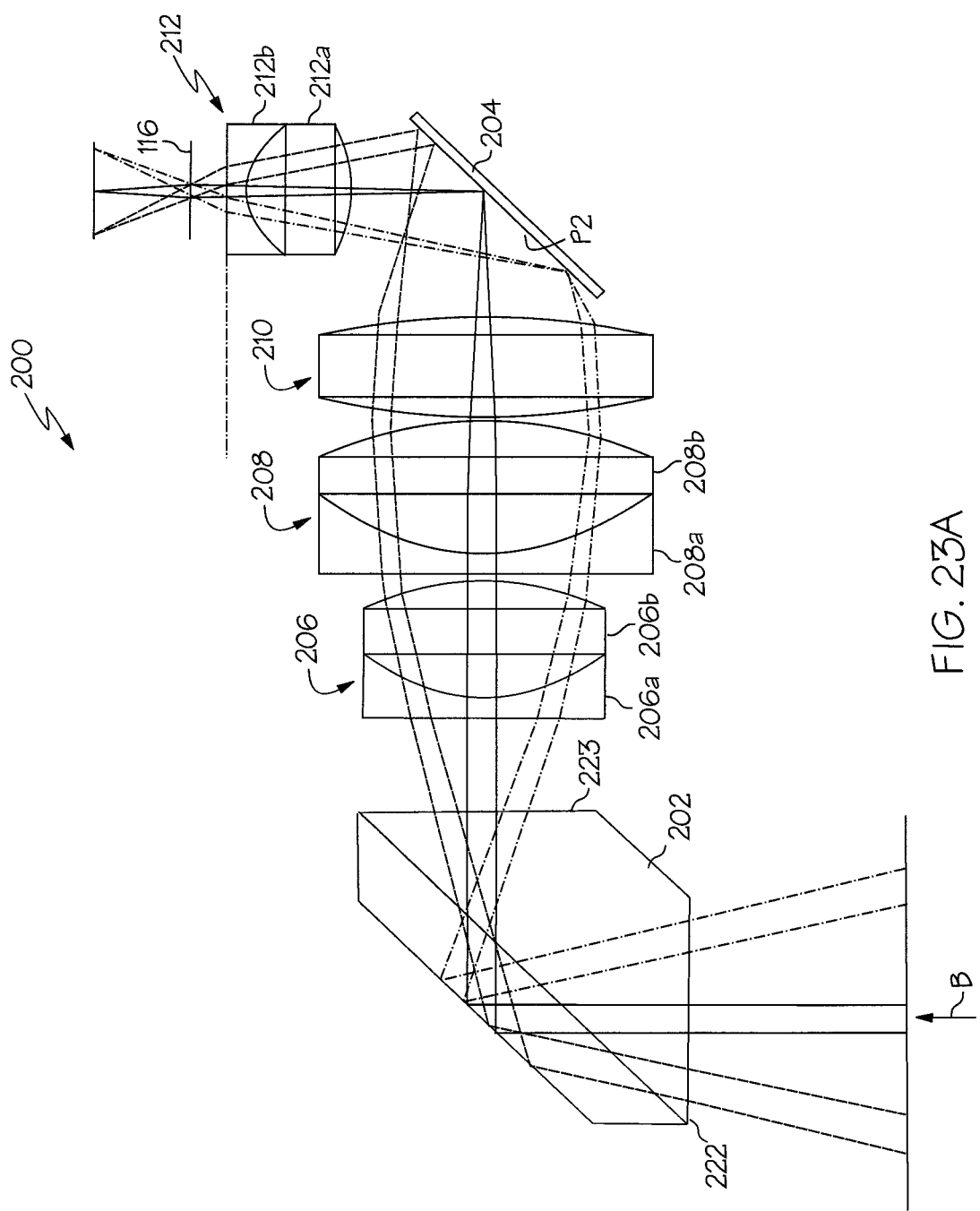
FIG. 23A illustrates one embodiment of an optical system comprising a first deviating optical element, a second deviating optical element, and corrective lenses.

FIG. 23A illustrates a variation of the backward looking optical system 200 (e.g. image diversion system) where first deviating optical element 202 is rotated 90° from the orientation shown in FIG. 23 allowing a forward view from the same optical system. It will be appreciated that first deviating optical element 202 can be housed in such a way to allow it to rotate giving a single image capture device a view in two or more directions. First deviating optical element 202 may be rotated into a desired position in any suitable manner including, for example, manually, automatically, by a motor, by a spring mechanism. In another embodiment, it will be appreciated that first deviating optical element 202 could be replaced with a beam splitter providing a simultaneous view in two directions to the imager of the image capture device.

Figure 24:
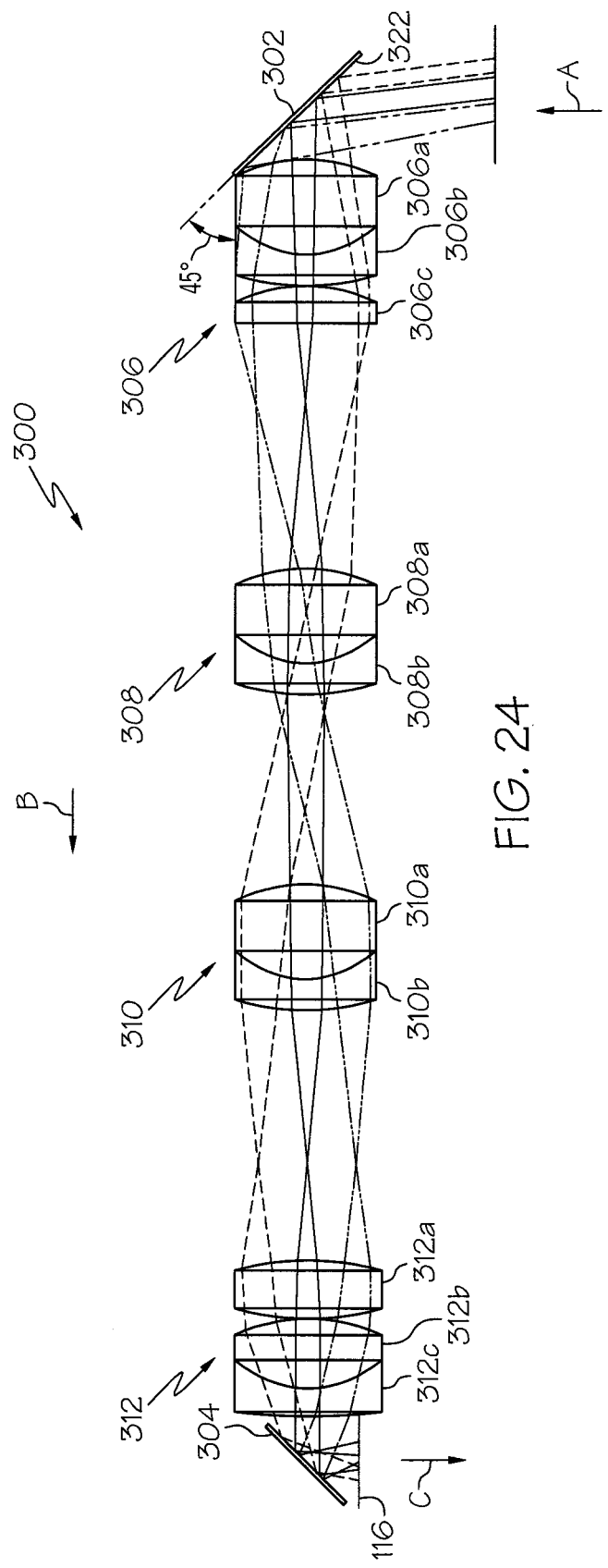
FIG. 24 illustrates one embodiment of an optical system comprising a first deviating optical element, a second deviating optical element, and corrective lenses.

FIG. 24 illustrates one embodiment of a backward looking optical system 300 (e.g., image diversion system) comprising a first deviating optical element 302, a second deviating optical element 304, and multiple corrective lenses 306, 308, 310, 312. Backward looking optical system 300 is contained within a housing that is attachable to a housing portion of an image capture device (not shown). Light from an object enters optical system 300 in the direction indicated by arrow A and is reflected by input surface 322 of first deviating optical element 302. The reflected light passes through corrective lenses 306, 308, 310, and 312 in the direction indicated by arrow B. Light is reflected by second deviating optical element 304 in the direction indicated by arrow C and the image is centered to lens 116 of image capture device 32 (FIG. 11). In the embodiment illustrated in FIG. 24, first and second deviating optical elements 302, 304 are mirrors oriented at 45°. Also, in the embodiment illustrated in FIG. 24 corrective lens 206 is a compound lens formed of plano-convex lens 306a optically coupled to positive meniscus lens 306b, which is optically coupled to plano-convex lens 306c. Lens 308 also is a compound lens formed of plano-convex lens 308a optically coupled to positive meniscus lens 308b. Lens 310 also is a compound lens formed of plano-convex lens 310a optically coupled to positive meniscus lens 310b. Lens 312 also is a compound lens formed of biconvex lens 312a optically coupled to plano-convex lens 312b, which is optically coupled to positive meniscus lens 312c. It will be appreciated that other combinations of deviating optical elements, corrective lenses, and inverting lenses may be employed without limitation. Also, any compound lens can be replaced by a comparable singe optical lens. Therefore, the embodiment illustrated in FIG. 24 should not be limited in this context. As previously described with reference to FIGS. 10-15, the image that enters lens 116 of image capture device 32 (not shown) is viewed on a display screen 7 (not shown) thereof.

Still with reference to FIG. 24, light from an object is reflected by input surface 322 of mirror 302. Light reflected by mirror 302 undergoes reversion and is deviated by 90° as it emerges from the reflective input surface 322. Light passes through lens 306 and a first intermediate real image is formed. As the light passes through corrective lenses 308 and 310 a second intermediate real image is formed. Light then passes through corrective lens 312 and is reflected by mirror 304 and emerges in the direction indicated by arrow C deviated by another 90°. The image appears centered to lens 116 of image capture device 32 (not shown) and is deviated by a total of 180° relative to the original object captured at input surface 322. Thus, the image is transferred through image diversion system 300 passively and agnostically without any software manipulation of the digitally captured image. The captured image may be reoriented using well known software manipulation techniques. A virtual image appears at the output (e.g., exit) aperture of lens 312 of image diversion system 300 having a wide field of view. The field of view of the virtual image appearing at the output aperture is at least 10° but preferably greater than 40°, and most preferably at least 50°.

Figure 25:
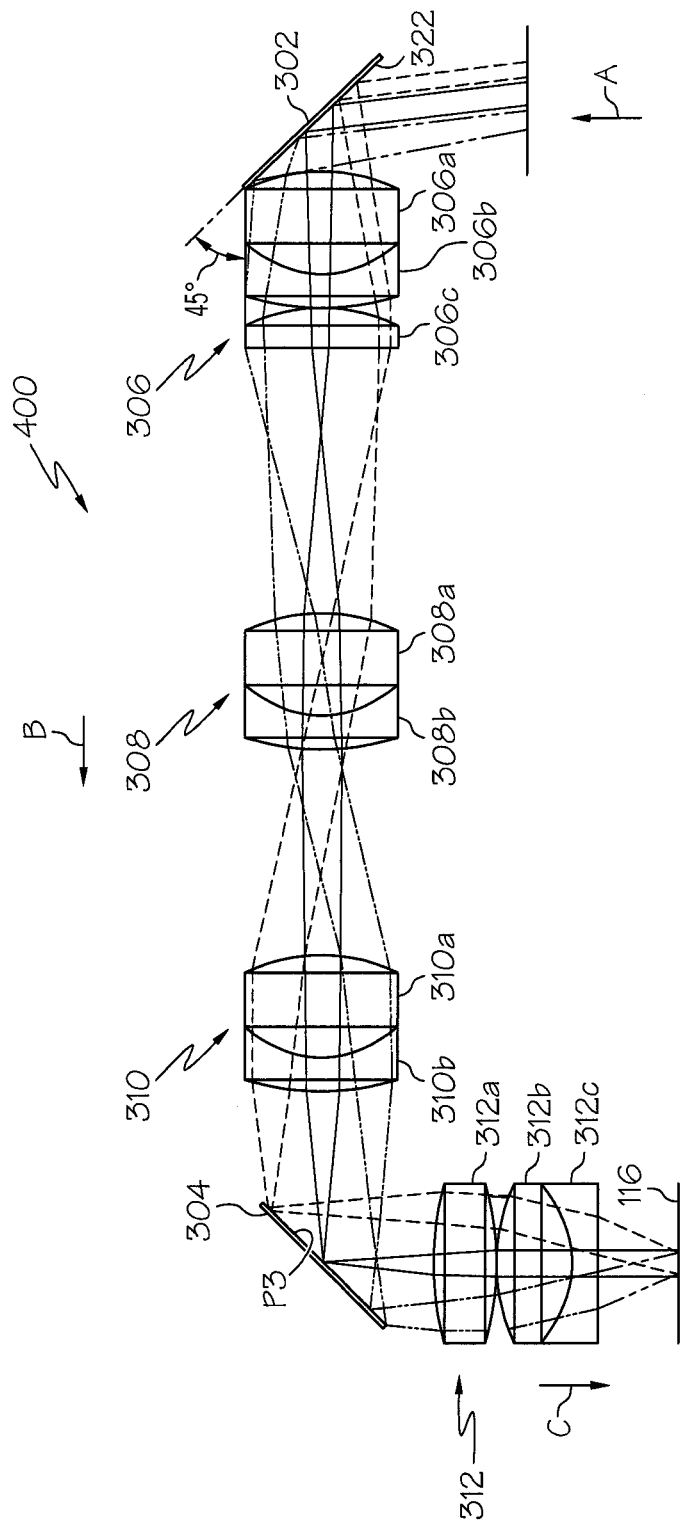
FIG. 25 illustrates one embodiment of an optical system comprising a first deviating optical element, a second deviating optical element, and corrective lenses.

FIG. 25 illustrates one embodiment of a backward looking optical system 400 (e.g., image diversion system) comprising first deviating optical element 302, second deviating optical element 304, and corrective lenses 306, 308, 310, 312. Backward looking optical system 400 is contained within a housing that is attachable to a housing portion of an image capture device (not shown). Backward looking optical system 400 comprises the same optical components of backward looking optical system 300 (FIG. 24) with the only difference being the placement of second deviating optical element 304. Accordingly, light from an object enters optical system 400 in the direction indicated by arrow A and is reflected by input surface 322 of first deviating optical element 302. The reflected light passes through corrective lenses 306, 308, and 310 and in the direction indicated by arrow B. Light reflects from second deviating optical element 304 in the direction indicated by arrow C, passes through corrective lens 312, and the image is centered to lens 116 of image capture device 32 (FIG. 11).

Still with reference to FIG. 25, a first intermediate real image appears between corrective lenses 306 and 308. A second intermediate real image appears after corrective lens 310, which coincides with the plane P3 of second deviating optical element 304. At plane P3, the second intermediate real image is reflected by second deviating optical element 304 and then passes through corrective lens 312 and emerges in the direction indicated by arrow C deviated by another 90°. The light is then centered to lens 116 of image capture device 32 (not shown) and is deviated by a total of 180° relative to the orientation of the original object captured at input surface 322. Thus the image is transferred through image diversion system 400 passively and agnostically without any software manipulation of the digitally captured image. The captured image may be reoriented using well known software manipulation techniques. A virtual image appears at the output (e.g., exit) aperture of lens 312 of image diversion system 400 having a wide field of view. The field of view of the virtual image appearing at the output aperture is at least 10° but preferably greater than 40°, and most preferably at least 50°.

Figure 26:
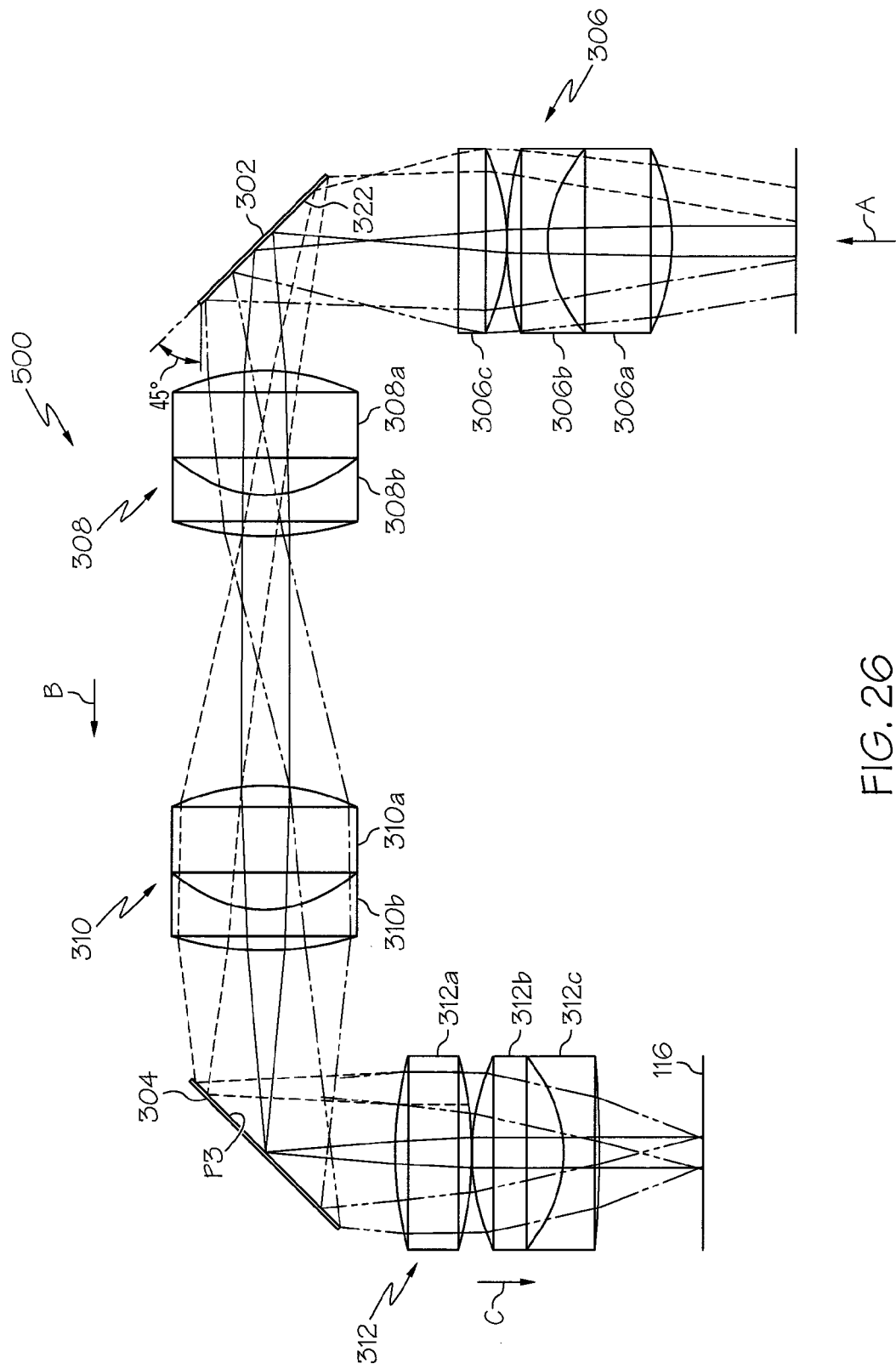
FIG. 26 illustrates one embodiment of an optical system comprising a first deviating optical element, a second deviating optical element, and corrective lenses.

FIG. 26 illustrates one embodiment of a backward looking optical system 500 (e.g., image diversion system) comprising first deviating optical element 302, second deviating optical element 304, and corrective lenses 306, 308, 310, 312. Backward looking optical system 500 is contained within a housing that is attachable to a housing portion of an image capture device (not shown). Backward looking optical system 500 comprises the same optical components of backward looking optical systems 400 with the only difference being the placement of first deviating optical element 302. Accordingly, light from an object enters optical system 400 in the direction indicated by arrow A and passes through corrective lens 306. The light emerging from corrective lens 306 is then reflected by input surface 322 of first deviating optical element 302. The reflected light passes through corrective lenses 308 and 310 in the direction indicated by arrow B. Light reflects from second deviating optical element 304 in the direction indicated by arrow C, passes through corrective lens 312, and the image is centered to lens 116 of image capture device 32 (FIG. 11).

Still with reference to FIG. 26, a first intermediate real image appears between corrective lens 306 and first deviating optical element 302. Light is reflected by first deviating optical element 302 and passes through corrective lenses 308 and 310. A second intermediate image appears at plane P3, which coincides with the plane of second deviating optical element 304. Light is reflected by second deviating optical element 304 and then passes through corrective lens 312 and emerges in the direction indicated by arrow C and deviated by another 90°. The light is then centered to lens 116 of image capture device 32 (not shown) and is deviated by a total of 180° relative to the orientation of the original object captured at input surface 322. Thus, the image is transferred through image diversion system 500 passively and agnostically without any software manipulation of the digitally captured image. The captured image may be reoriented using well known software manipulation techniques. A virtual image appears at the output (e.g., exit) aperture of lens 312 of image diversion system 500 having a wide field of view. The field of view of the virtual image appearing at the output aperture is at least 10° but preferably greater than 40°, and most preferably at least 50°.

It will be appreciated that various embodiments of backward looking optical systems 300, 400, 500 shown in respective FIGS. 24, 25, 26 may be modified such that first deviating optical elements 302, 402, 502 may be replaced with a "roof" prism, right angled prism or any suitable prism without limiting the scope of the disclosed embodiments. Furthermore, various embodiments of backward looking optical systems 300, 400, 500 shown in respective FIGS. 24, 25, 26 may be modified such that first deviating optical elements 304, 404, 504 may be replaced with a "roof" prism, right angled prism or any suitable prism without limiting the scope of the disclosed embodiments. Accordingly, the disclosed embodiments should not be limited in this context.

Housings can be adapted to mount onto existing image capture devices in a variety of ways. The mounting mechanism can be separate from or integral with the housing. That is, the housing and mounting mechanism can be two separate pieces that fit or can be held together or can be one single piece.

In both embodiments of separate or integral mounting mechanisms, the mounting mechanism can include, but is not limited to: a friction fit or clip-on case, battery pack, or other attachment with a pivoting housing; a mounting mechanism (such as, but not limited to a clip or suction cup) attached to the housing that allows the housing to pivot when it is attached directly to the image capture device; or a non-movable mounting mechanism either, without limitation, in the form of a case or battery pack integral with the housing, or in the form of clips, brackets with fasteners, adhesives, snaps, dome-fasteners, VELCRO® (Velcro Industries B.V., Curacao, Netherlands Antilles), suction-cups, or magnets to attach or slidably connect the housing to an image capture device or a case for an image capture device.

Figure 26A:
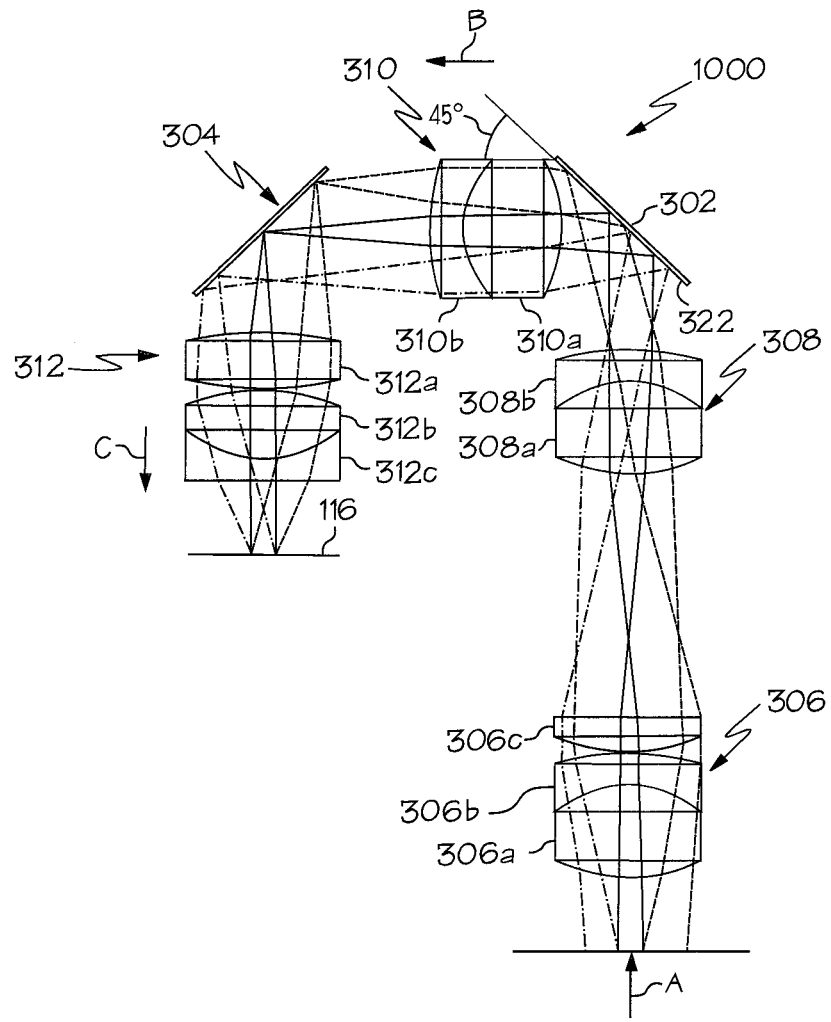
FIG. 26A illustrates one embodiment of an optical system comprising a first deviating optical element, a second deviating optical element, and corrective lenses.

FIG. 26A illustrates one embodiment of a forward and backward looking optical system 1000 (e.g., image diversion system) comprising a first deviating optical element 302, a second deviating optical element 304, and corrective lenses 306, 308, 310, 312. Forward and backward looking optical system 1000 is contained within a housing that is attachable to a housing portion of an image capture device (not shown). Forward and backward looking optical system 1000 comprises the same optical components of backward looking optical systems 500 with the differences being the placement of first deviating optical element 302 and the capability of the second deviating optical element having the capability to rotate 45° from the origin. Accordingly, light from an object enters optical system 1000 in the direction indicated by arrow A and passes through corrective lens 306 and 308. The light emerging from corrective lens 308 is then reflected by input surface 322 of first deviating optical element 302. The reflected light passes through corrective lens 310 in the direction indicated by arrow B. Light reflects from second deviating optical element 304 in the direction indicated by arrow C, passes through corrective lens 312, and the image is centered to lens 116 of image capture device 32 (FIG. 11).

Figure 26B:
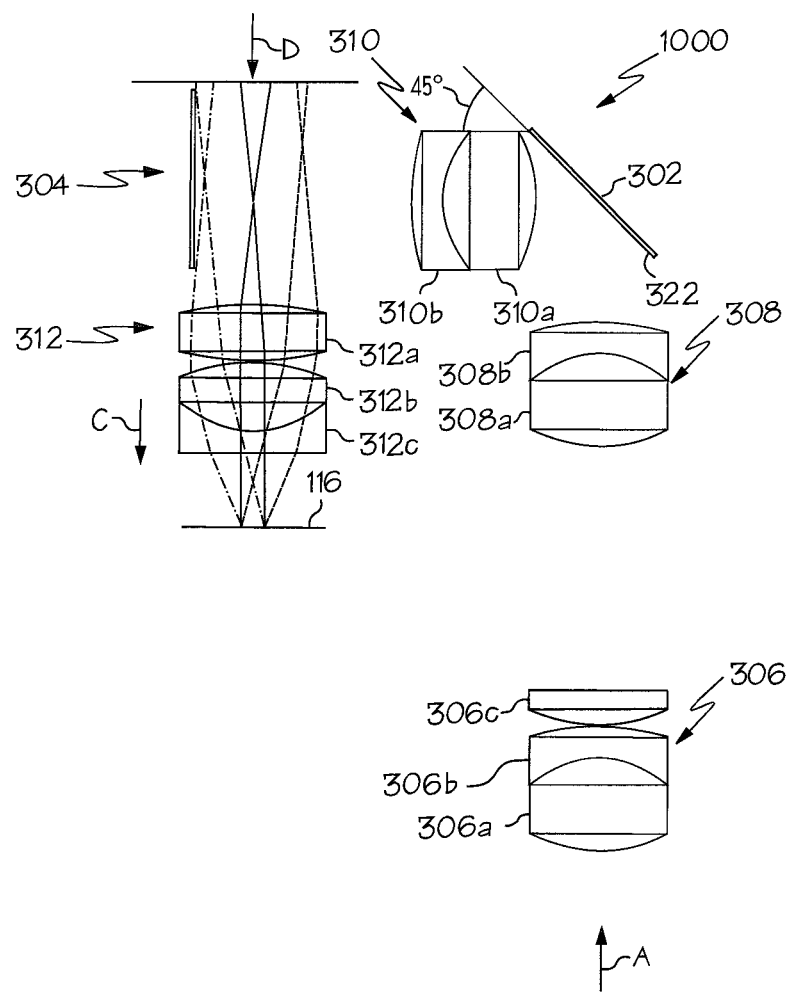
FIG. 26B illustrates one embodiment of an optical system comprising a first deviating optical element, a second deviating optical element, and corrective lenses.

FIG. 26B illustrates optical system 1000 depicted in FIG. 26A with second deviating optical element 304 rotated 45° from its placement in FIG. 26A. In this embodiment, light from an object enters optical system 1000 in the direction indicated by arrow D and passes through corrective lens 312, and the image is centered to lens 116 of image capture device 32 (FIG. 11). Second deviating optical element 304 may be rotated into a desired position in any suitable manner including, for example, manually, automatically, by a motor, by a spring mechanism. In another embodiment, it will be appreciated that second deviating optical element 304 could be replaced with a beam splitter providing a simultaneous view in two directions to the imager of the image capture device.

Figure 27:
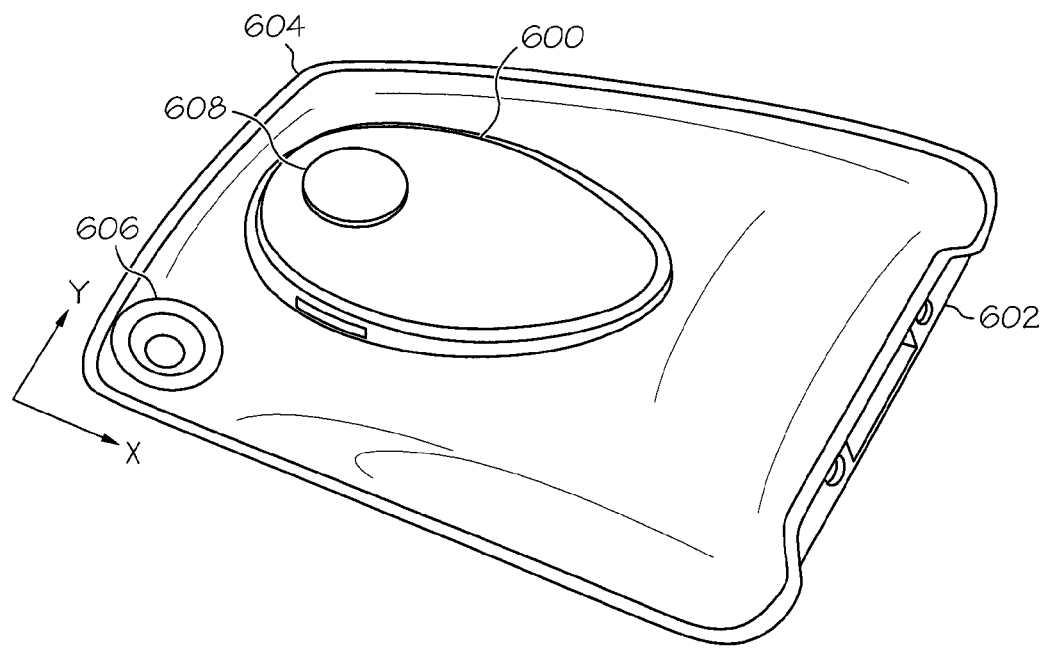
FIG. 27 is a perspective view of one embodiment of a housing for an optical system mounted to an image capture device via a case for the image capture device.

FIG. 27 is a perspective view of one embodiment of a housing 600 for an optical system mounted to an image capture device 602. Housing 600 is stone or oval-shaped, but in other embodiments housings can be any appropriate shape including without limitation square, rectangular, circular, diamond-shaped, triangular, rhomboid, or any other regular or irregular shape. As shown, housing 600 is integral with case 604 (which is also the mounting mechanism) that covers image capture device 602, but in alternate embodiments housing 600 can attach or slidably connect directly to the image capture device with a mounting mechanism such as, without limitation, clips, adhesives, snaps, dome-fasteners, VELCRO®, suction-cups, or magnets. Case 604, is designed to fit around lens 606 of image capture device 602 and can attach to image capture device 602 via clips, friction fit, or other mechanisms known to those of ordinary skill in the art.

Housing 600 includes depressible plunger 608. When pressed down, depressible plunger 608 allows housing 600 to pivot around depressible plunger 608, positioning the image diversion system and housing 600 in the desired location over lens 606 of image capture device 602. Some housing embodiments can pivot around their mounting mechanism or attachment to a case or image capture device without a depressible plunger or equivalent holding them in place or securing the housing's position when the image diversion system is not in use.

Figure 28:
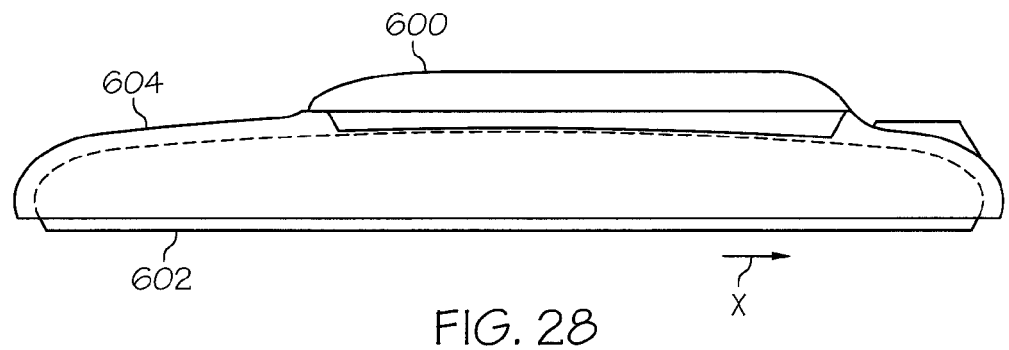
FIG. 28 is a side view along the x-axis of the image capture device shown in FIG. 27.

FIG. 28 is a side view along the x-axis of image capture device 602 (i.e., a side view of the long side of the rectangle of image capture device 602) showing housing 600 attached to case 604, which without limitation, friction-fits or clips on to image capture device 602. Housing 600 adds some thickness to the image capture device 602. The total thickness of image capture device 602 with case 604 and housing 600 can be 30 mm or less, 25 mm or less, 20 mm or less, or 15 mm or less. The thickness of other image capture devices with attached housings can vary depending on the type of image capture device and the type of housing, but in certain embodiments the thickness added by a mounted housing does not exceed 25 mm. In some embodiments housings add less than 12 mm in thickness when attached to an image capture device. Case 604 can be 117 mm in length. In other embodiments, cases can be longer or shorter depending on the size of the image capture device a particular case is designed to fit.

Figure 29:
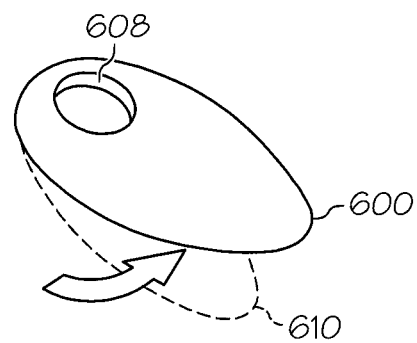
FIG. 29 is a perspective view of the housing shown in FIG. 27.

FIG. 29 is a perspective view of housing 600. By pressing depressible plunger 608, the position of housing 600 is unlocked form its default position 610 and can be pivoted about depressible plunger 608. Although FIG. 29 shows housing 600 being pivoted in a counter-clockwise direction, it is within the scope of this disclosure for the housing to pivot clockwise, counter-clockwise, or in both directions.

Figure 30:
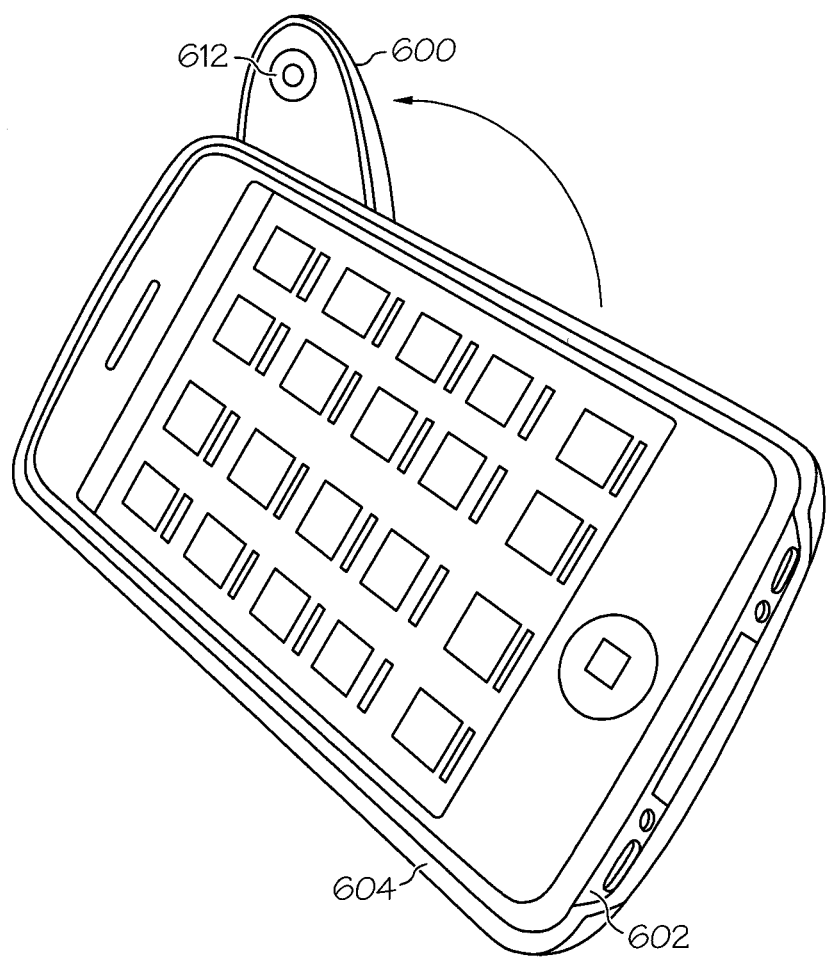
FIG. 30 is a perspective view of the housing shown in FIG. 29 pivoted from its default position such that an aperture is exposed and faces out on the display side of image capture device to allow for image diversion.

FIG. 30 is a perspective view of housing 600 showing the display side of image capture device 602. Housing 600 is pivoted from its default position such that it covers the image capture device lens (not shown) and exposes aperture 612 is exposed and faces out on the display side of image capture device 602 to allow for image diversion. As shown, housing 600 is attached to case 604 which can, without limitation, clip on or friction fit to image capture device 602. This disclosure also covers embodiments in which housing 600 is directly mounted to the image capture device via a mounting mechanism (including, but not limited to, clips, adhesives, snaps, dome-fasteners, VELCRO®, suction-cups, or magnets), and housing 600 pivots around that mounting mechanism so as to expose aperture 612 on the display side of image capture device 602.

Figure 31A:
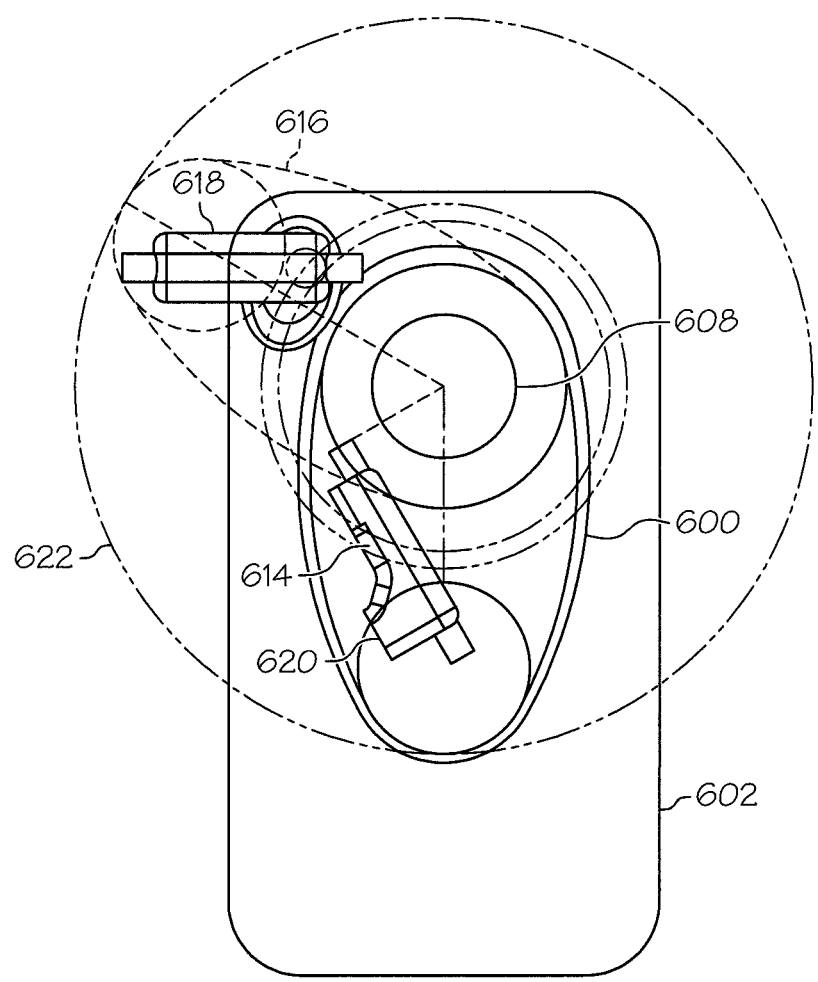
FIG. 31A shows a schematic of a plan view of one embodiment of a pivoting and rotating optical system and housing shown in FIG. 27.
Figure 31B:
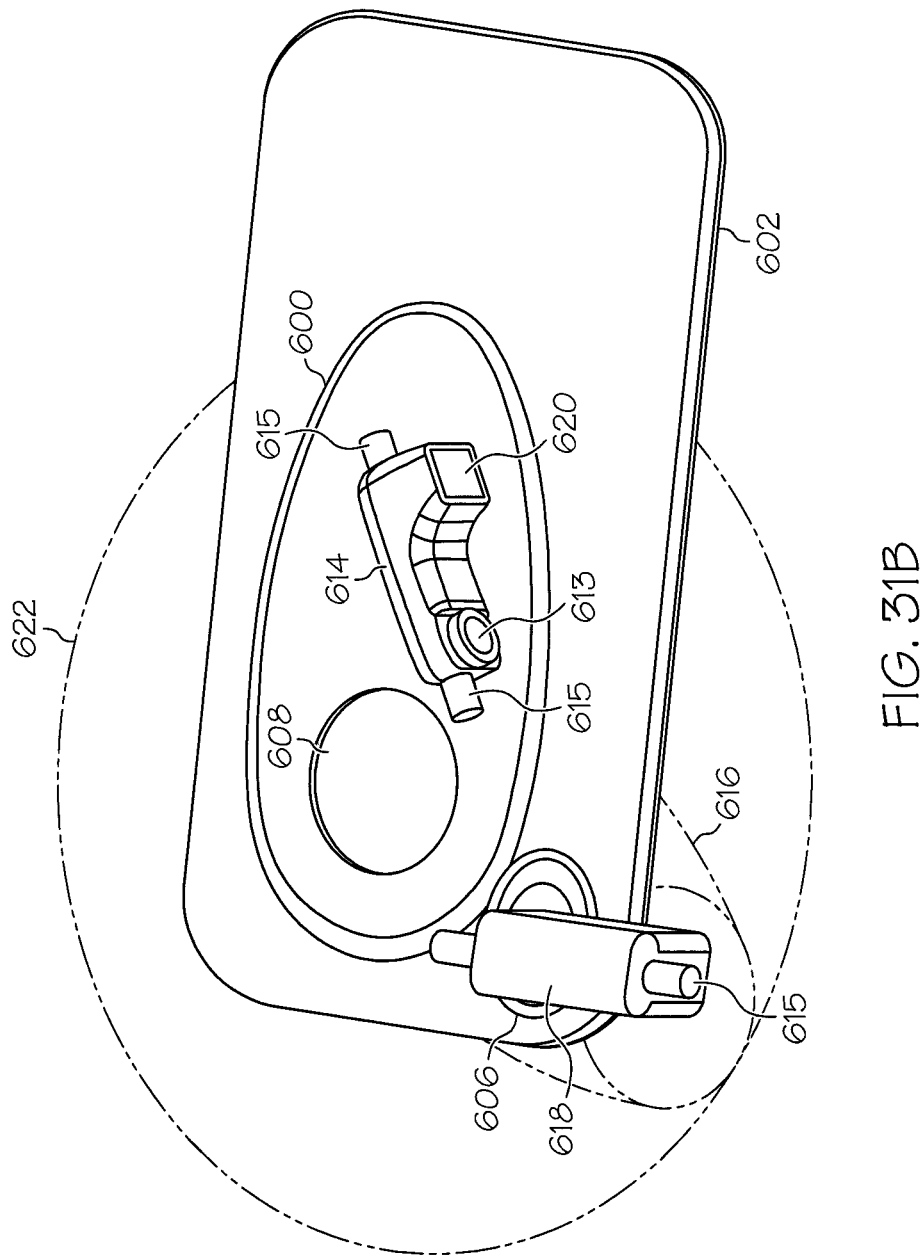
FIG. 31B shows a schematic of a perspective view of one embodiment of a pivoting and rotating optical system and housing shown in FIG. 27.

FIGS. 31A and 31B show schematics of the pivoting and rotating capabilities of optical system 614 (e.g., lens stack) and housing 600 in plan view (FIG. 31A) and perspective view (FIG. 31B). Housing 600 is in its default position attached to image capture device 602 either directly or via a case designed for image capture device 602. While in this default position, optical system 614, located within housing 600, is rotated on its side so as to limit the thickness that housing 600 adds to image capture device 602. Housing 600 can be pivoted about depressible plunger 608 or, in embodiments with no depressible plunger 608, about its mounting mechanism (not shown, but in the vicinity for depressible plunger 608).

In FIGS. 31A and 31B, housing 600 can be pivoted to desired position 616. When depressible plunger 608 is pressed and housing 600 is pivoted, optical system 614 is rotated from its side position to a vertical position 618. In some embodiments, magnets or other mechanisms known to those of ordinary skill in the art located inside housing 600 can be used to rotate pivot points 615 of optical system 614. As a result lens optical system 614 is moved into its vertical position 618 as housing 600 is pivoted. Vertical position 618 enables aperture 620 that was previously on its side to be face out on the display side of image capture device 602. As shown in FIG. 13B, in vertical position 618, lens 613 is tightly aligned against lens 611 of image capture device 602 to allow for image diversion. In some embodiments, lens 613 will be surrounded by a seal, o-ring, or gasket that seals the connection with lens 611 to prevent loss of light or pollution by ambient light. Although FIGS. 31A and 31B show an exemplary embodiment wherein optical system is rotatable, this disclosure also covers embodiments where the optical system is not rotated on its side when in not in use, i.e., where the optical system is always in the position required for image diversion, for example, but not limited to, in a non-movable housing such as that depicted in FIGS. 27B and 30B.

In one embodiment, housing 600 can be pivoted to any position within its 360° radius 622. In other embodiments, the pivoting capability can be limited to movement within a certain angle, for example housing 600 may not be able to pivot to a position other than or beyond desired position 616. In some embodiments, housing 600 can pivot either clockwise or counter-clockwise; yet in other embodiments, housing 600 can only pivot in one direction, for example only clockwise to desired position 616.

Figure 32:
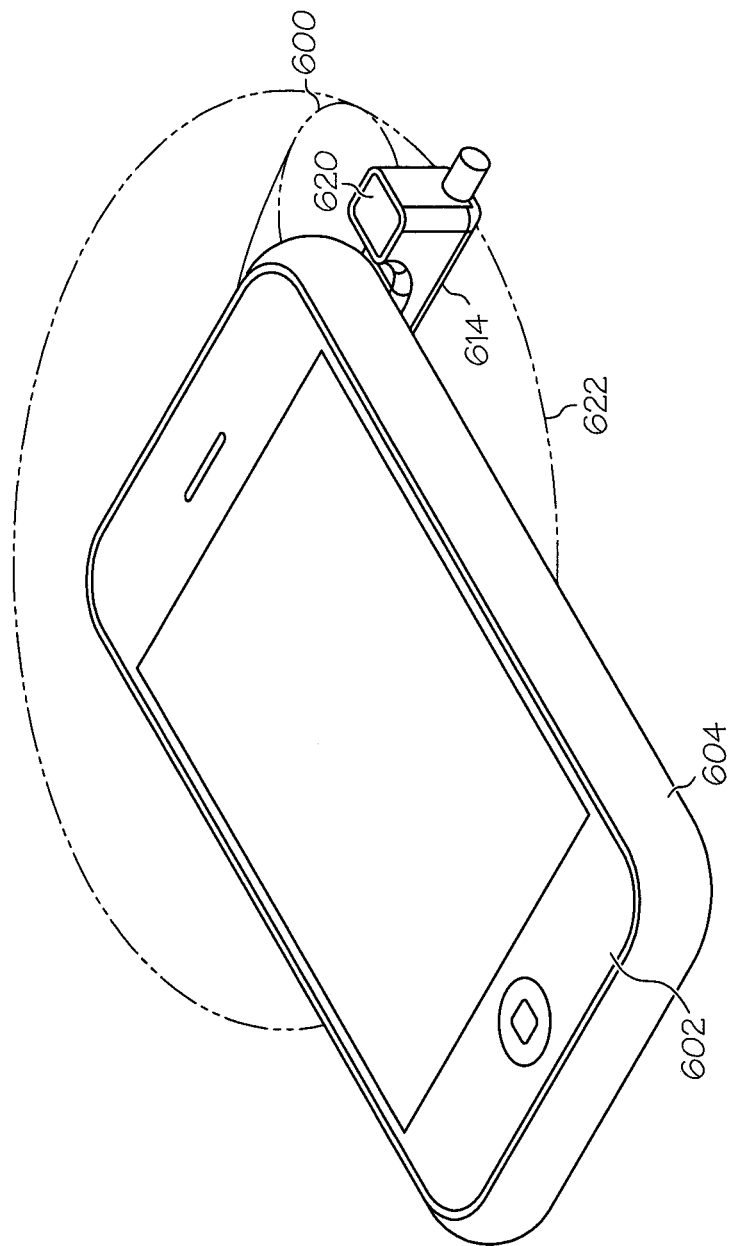
FIG. 32 shows a perspective view of the display side of the image capture device shown in FIGS. 27 through 31 with optical system rotated inside the housing.
Figure 34:
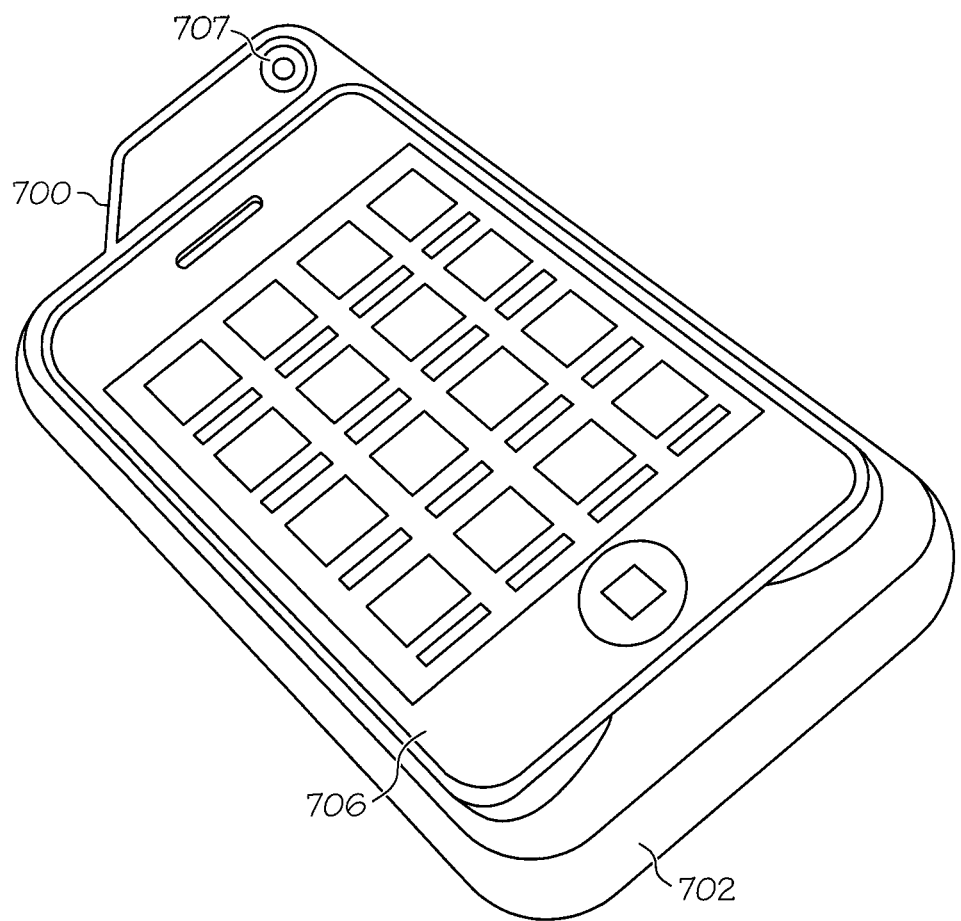
FIG. 34 is a perspective view of the non-movable housing shown in FIG. 33 as seen from the display side of the image capture device.

FIG. 32 shows a perspective view of the display side of image capture device 602 with optical system 614 mounted inside housing 600. The embodiment illustrated in FIG. 32 depicts housing 600 attached to case 604 that is designed to fit image capture device 602. Housing 600 is pivoted from its default position such that aperture 620 of optical system 614 faces the display side of image capture device 602 so as to facilitate image diversion. The location of housing 600 is not limited to the position depicted, but can pivoted around its mounting mechanism (not shown) so that it can move to other positions on its 360° radius 622. FIG. 34 also shows that optical system 614 is only marginally thicker than the image capture device 602.

Figure 33:
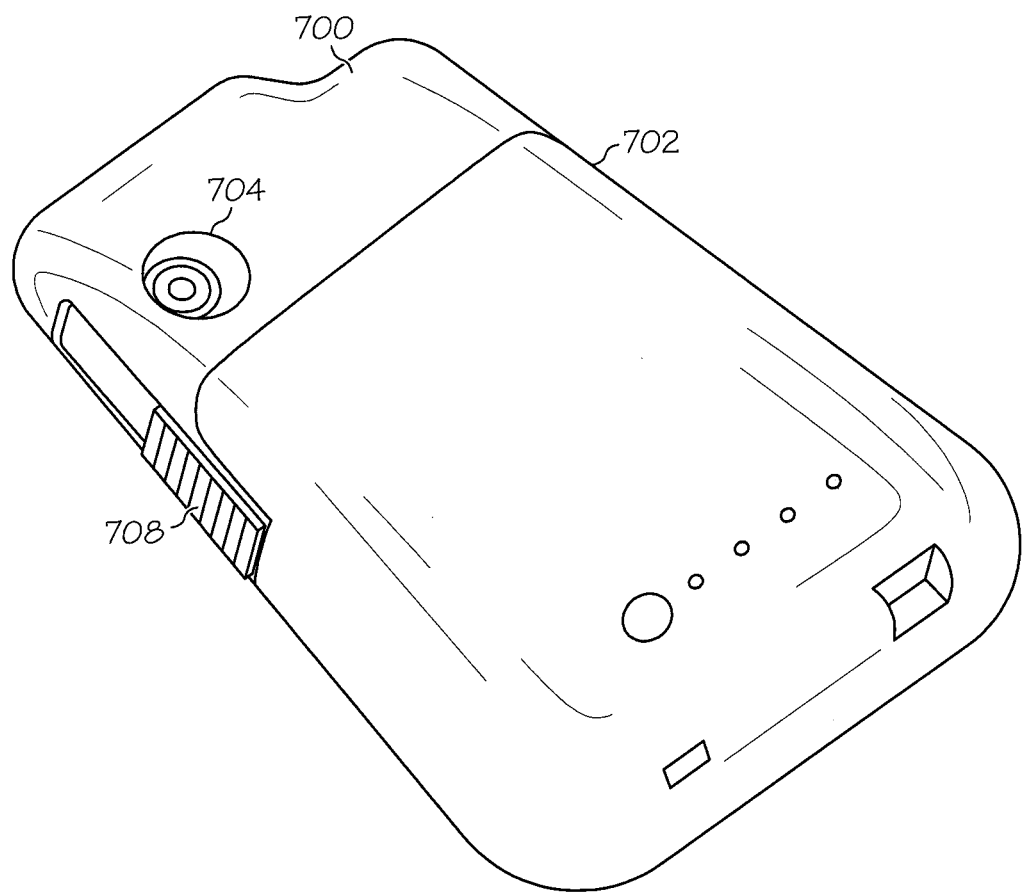
FIG. 33 is a perspective view of another embodiment of a housing for an optical system mounted to an image capture device.

FIG. 33 is a perspective view of another embodiment of a housing 700 for an image diversion system mounted directly to an image capture device. Housing 700 can slidably attach, clip, or connect to a battery pack 702, such that together housing 700 and battery pack 702 encase the image capture device. Housing 700 is integral with the mounting mechanism to the image capture device and can attach thereto via clips, friction fit, or other mechanisms known to those of ordinary skill in the art such as, without limitation, adhesives, snaps, dome-fasteners, VELCRO®, suction-cups, or magnets.

Unlike the embodiment illustrated in FIGS. 27 through 32, as a non-movable mounting mechanism, housing 700 is fixed in one position on the image capture device. Housing 700 is designed to fit around lens 704 of an image capture device. Additionally, slider switch 708 is used to move the image diversion system into place, to switch back to the ordinary image capture device lens, and/or to cover and protect lens 704 when neither the image diversion system nor the ordinary image capture device is in use. The disclosure is not limited to slider switch 708, other embodiments can use alternative switches, elements, or settings to perform the same function as slider switch 708.

FIG. 34 is a perspective view of housing 700 of FIG. 33 showing the display side of image capture device 706. Housing 700 is also the non-movable mounting mechanism that positions aperture 707 on the display side of image capture device 706 for image diversion and that slidably attaches, clips, or connects to a battery pack 702. Together battery pack 702 and housing 700 surround image capture device 706, and in some embodiments battery pack 702 and housing 700 will add uniform thickness to image capture device 706 so that the back of the device remains level. Other embodiments of a non-movable housing can be attached to an image capture device, case, or battery pack in a variety of ways including, but not limited to clips, brackets with fasteners, adhesives, snaps, dome-fasteners, VELCRO®, suction-cups, or magnets.

Figure 35C:
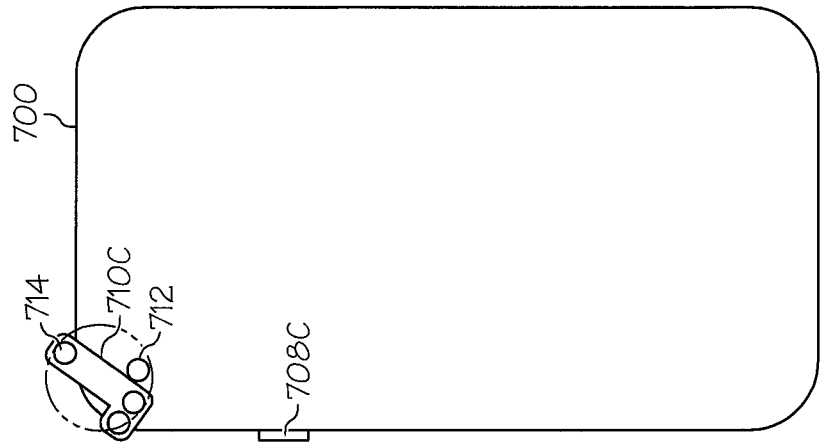
FIGS. 35A, 35B, and 35C are schematic diagrams illustrating three different positions of a optical system as a slider switch on the non-movable housing shown in FIGS. 33 and 34 is moved.
Figure 35B:
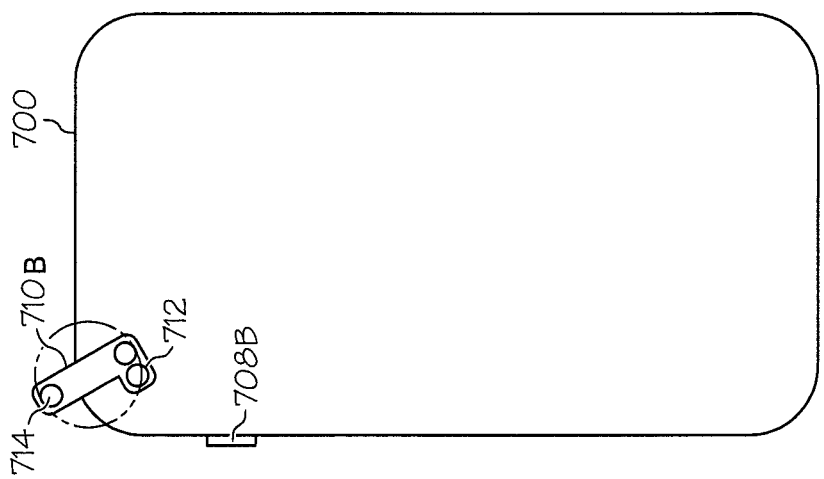
Figure 35A:
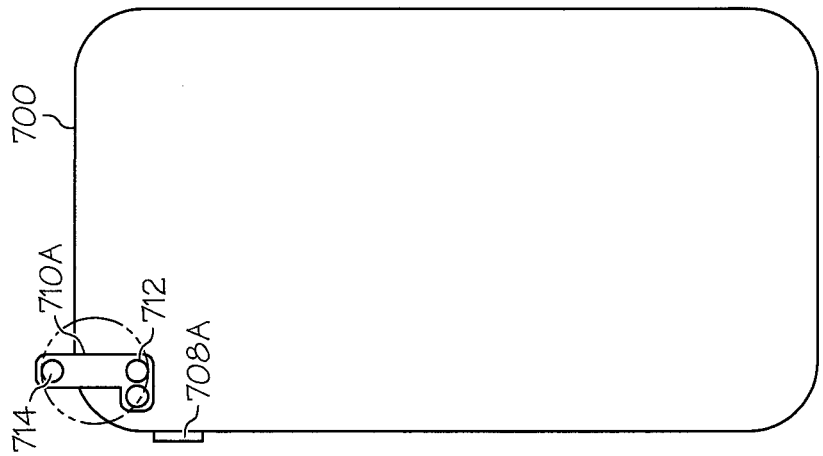

FIGS. 35A, 35B, and 35C are schematic diagrams illustrating a optical system in three different positions (710A, 710B, and 710C) inside a housing (not shown) as a slider switch is moved. In FIG. 35A, the slider switch is in position 708A, which aligns the optical system for image diversion. As slider switch is moved into position 708A, the optical system is moved into its vertical position 710A such that it tightly aligns to lens 712 of image capture device 700. In addition, in this vertical position, aperture 714 of the image diversion system is open and faces the display side of image capture device 700.

In FIG. 35B, the slider switch is position 708B, which moves optical system into position 710B. In position 710B, both the lens 712 of image capture device and aperture 714 of the image diversion system can be covered. Thus, when optical system is in position 710B, the image capture device is off and both aperture 714 and lens 712 are protected.

In FIG. 35C, the slider switch is in position 708C, which moves the optical system into position 710C such that lens 712 is exposed. In position 710C, aperture 714 is closed, and the image capture device can function as it ordinarily would if no image diversion system were attached.

Although FIGS. 35A, 35B, and 35C, illustrate three positions of slider switch (708A, 708B, and 708C) in a specific order, any order of these positions and the corresponding positions of the optical system is covered by this disclosure. In addition, some embodiments may only include the optical system in two positions, for example without limitation, either the lens 712 or aperture 714 could be exposed and there could be on position in which both are covered.

FIG. 36 is a plan view of a different embodiment of a housing 800 non-movably mounted to image capture device 802. Housing 800 is attached such that aperture 804 faces the display side of image capture device 802, and the optical system (not shown) can be tightly aligned against the lens (not shown) of the image capture device 802. In the depicted embodiment, housing 800 is attached to image capture device 802 rather than to a case as depicted in FIGS. 27 through 32.

FIG. 37 is a side view of housing 800. Housing 800 is also the mounting mechanism: a U-shaped clip that attaches or slidably connects to align with the lens of image capture device 802 such that seal, gasket, or o-ring 806 sealably connects with the lens of an image capture device. This disclosure also covers housings that are not integral with clip or mounting mechanism, such as, but not limited to, housings that attach to an image capture device by a separate non-movable clip or bracket.

For example, an embodiment can use a bracket mounting mechanism that includes housing mount portion and an image capture mount portion. The housing mount portion includes at least two mount openings that are located to align with mount points on the housing and mounted to the housing with a fastener such as screw, snap, or dome-fasteners. The image capture mount portion extends from the housing mount portion to provide a mount location for the image capture device.

In other embodiments, a mounting mechanism can include a suction bracket or cups, VELCRO®, adhesives, snaps, dome-fasteners, or magnets all of which either secure housing 702 in one position, or allow it to pivot around its point of attachment.

FIGS. 27-37 depict embodiments attached by mounting mechanisms to an image capture device such as a personal device or mobile phone. The mounting mechanisms and/or housing disclosed herein are not limited to such image capture devices, and can be modified for other image capture devices such as cameras, camcorders, microscopes, telescopes, binoculars, or spectacles.

FIGS. 38A, 38B, 39A, and 39B illustrate some additional exemplary embodiments of image diversion systems mounted to a scuba mask (FIGS. 38A-B) and ski goggles (FIGS. 39A-B). As shown in FIGS. 38A and 39A, the images in the field of view behind the wearer of the adapted scuba mask or ski goggles can be received by the optical system and projected on a display in part of the scuba mask or ski goggles such that the wearer can perceive what is behind them. FIG. 38B illustrates on potential mechanism and/or method by which this is perceived by a wearer of the personal optical device. FIG. 39B shows one exemplary embodiment of the display and optical device attached to the personal optical device. It will be appreciated by those skilled in the art that the images diversion systems illustrated in FIGS. 38A-B and 39A-B can be adapted and/or configured to be mounted to a pair of eyeglasses or other personal optical devices.

FIG. 40 illustrates an image capture system configured in a photographic mode. As shown, an object "F" is captured by an image capture device and is displayed on a display as a photographic image.

Figure 41:
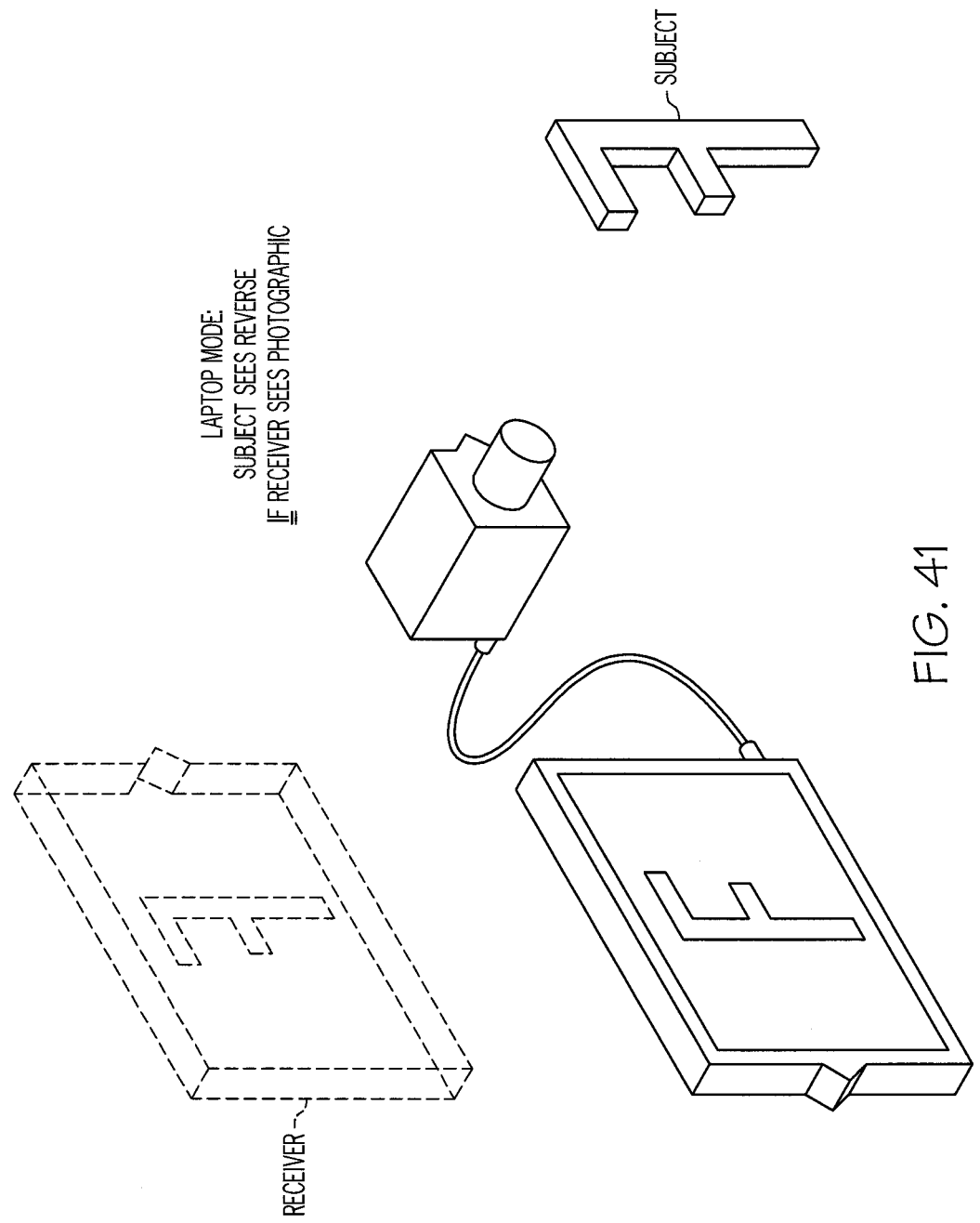
FIG. 41 illustrates an image capture system operating configured in a laptop mode.

FIG. 41 illustrates an image capture system operating configured in a laptop mode. In this mode, a subject sees a reverse image of an object "F" if an image capture device sees the image in photographic mode.

Figure 42:
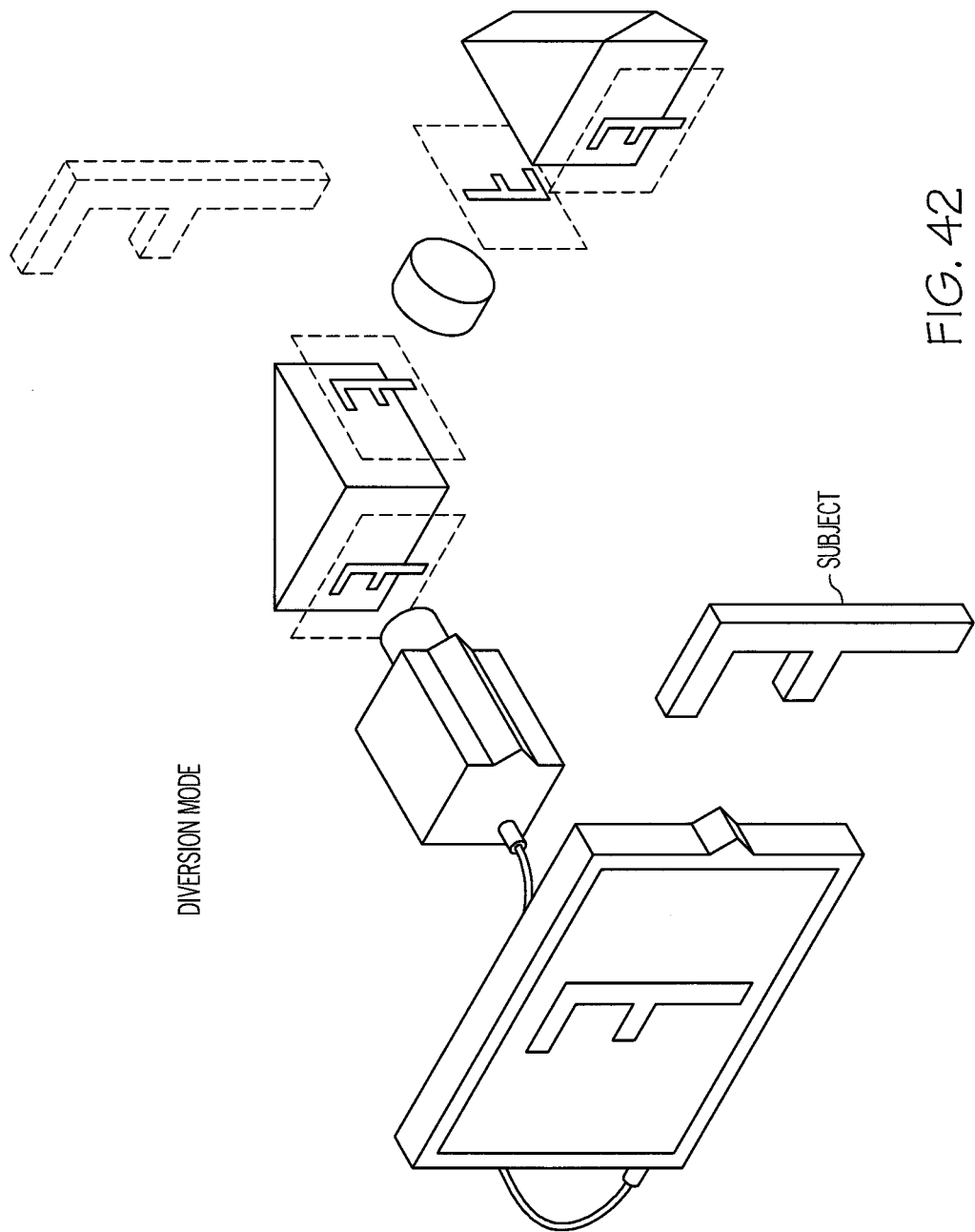
FIG. 42 illustrates an image capture system configured in a diversion mode.

FIG. 42 illustrates an image capture system configured in a diversion mode. In diversion mode, an image of an object "F" is diverted by 180° and is displayed on the display as a mirror image of the object "F."

Embodiments of the image diversion systems described and depicted herein may be employed in a variety of non-limiting applications. For example, the disclosed image diversion systems may be incorporated in any device that "sees" such as cameras, microscopes, telescopes, and other kinds of scopes. As is clear from this disclosure, embodiments described herein encompass image diversion systems that can be mounted to existing image capture devices or alternatively, can be integrated or built into a variety of image capture devices. Such devices equipped with an image diversion system could instantly provide a reverse view, deliver this reverse view passively and agnostically (cleaner, cheaper), and at any size that can be configured and/or adapted to optically couple to the iris of the imager.

Broadly speaking, embodiments of the image diversion systems described and depicted herein may be employed in at least three categories of applications: visual identification, visual communication, and visual control. For each of these applications, one or two specific applications will be described below.

In various embodiments, the image diversion systems described herein may be employed in visual identity systems to view the identification of a user and in doing so establish a dynamic biometric. A dynamic biometric equipped with one embodiment of the described image diversion system would allow for persistent motion detection of an authorized user. A static signature, password, faces, and fingerprints can be hacked. Dynamic biometric identifiers, like a moving retina or a walking gait however, are much harder to hack. Also, cracking this type of security means attacking the software or the electrical source (rebooting), which is difficult to do if the image diversion system is agnostic and passive.

In various embodiments, the image diversion systems described herein may be employed in applications that identify and lock or unlock a device, account or document. For example, when calling an entity such as a bank that requires a password using an image capture device (e.g., Blackberry® or iPhone®) equipped with one embodiment of the described image diversion system, the entity can remotely activate the camera of the image capture and use the reverse view to identify the face of the caller as a form of visual identification.

In various embodiments, the image diversion systems described herein may be employed in applications that provide visual prescreening for visual identification of a caller to receive or reject a video call. When video calls become more prevalent it will be important for receivers and callers to pre-establish that the person calling is the right person. A simple picture taken of a caller and sent along with their phone call allows the person receiving the call to "see" that person's face at the same time as the call is ringing.

In various embodiments, the image diversion systems described herein may be employed in visual communication applications where visual aspects of the communication are relevant but sound is not. Mobile visual monitoring using the image diversion systems described herein will allow a mother to remotely monitor her baby and at the same time for a baby to see her mother. In other applications, the deaf could use the visual aspects of the image diversion systems described herein to communicate with sign language and lip reading. The image diversion systems described herein also can be employed in visual and verbal chat applications.

In various embodiments, the image diversion systems described herein may be employed in visual controller applications. For example, the image diversion systems described herein may be employed to control, emote or otherwise animate a character in a video game using changes in a users face. The reverse view provided by the image diversion systems described herein would allow a user's face to animate an in-game avatar "face." For example, as a visual indicator allowing competitors to detect a "tell" in an online gambling game or as a more realistic and authentic form of communication (i.e., face-to-face) between players or player avatars.

In certain embodiments, when an embodiment disclosed herein is attached to an image capture device, the device can only capture the diverted image until the housing is removed. That is, when the device is attached, the diversion mechanism is found in front of the image capture device's lens and does not move from this position.

In other embodiments, when an embodiment disclosed herein is attached to an image capture device, the device can capture images in the conventional "forward looking" direction (i.e., 0° diversion angle) and in the diverted angle. Thus, these embodiments provide bi-directional image capture devices. In one embodiment allowing bi-directional image capture, the image diversion mechanism can move relative to the mounted housing and/or the lens of the image capture device. This can be accomplished by, for example and without limitation, sliding or swinging the image capture device away from the lens of the image capture device. Therefore, in these embodiments, the housing need not be removed in order to capture non-diverted images.

Embodiments disclosed herein also include devices that allow the amount of image diversion to be adjusted from 0° to 360° in any direction. These embodiments can be referred to as pivot lens embodiments.

Using software manipulation techniques, embodiments of the image diversion systems and image capture devices can be configured to provide various views of the captured image. In one embodiment, a preview screen could be split to show both directions simultaneously. The systems and methods also can be used to take multiple images from a fixed location. The multiple images could then be stitched together, for example, to create a panoramic image that can provide a panoramic view of the user's surroundings. Preview screens and personal computer monitors can show one view or can be split to show the "look backward" self portrait angle (180° diversion), the standard forward looking angle (0° diversion) and/or any diversion angle in between (sideways and/or up and/or down including panoramic images). Systems and methods disclosed herein also can be used to divert images such that a number of angles in addition to (or in place) of the look backward 180° angle are provided. Systems and methods also can be used to provide a "concert viewer" image diversion. In this embodiment, the image capture device could be elevated above the user's head and the image diverted such that the user could preview the image captured with the device when held at the elevated position.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosed embodiments are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the disclosed embodiments (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods disclosed herein can be performed in any suitable order unless otherwise indicated herein or otherwise clearly contradicted by context. The use of any and all examples, or exemplary language (e.g., "such as") provided herein is intended merely to better illuminate the disclosed embodiments and does not pose a limitation on the scope of the appended claims. No language in the specification should be construed as indicating any non-claimed element essential to the practice of any of the disclosed embodiments.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are disclosed herein include the best mode known for carrying out embodiments in accordance with the appended claims. Of course, variations on these described embodiments will become apparent to those of ordinary skill in the art upon reading the foregoing description. The applicants expect skilled artisans to employ such variations as appropriate, and the applicants intend for the embodiments in accordance with the appended claims to be practiced otherwise than specifically disclosed herein. Accordingly, the disclosed embodiments include all modifications and equivalents of the subject matter recited in the claims appended hereto as permitted by applicable law. Moreover, any combination of the above-described elements in all possible variations thereof is encompassed by the appended claims unless otherwise indicated herein or otherwise clearly contradicted by context.

Specific embodiments disclosed herein may be further limited in the claims using consisting of or and consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments in accordance with the appended claims are inherently or expressly described and enabled herein.

In closing, it is to be understood that the various embodiments disclosed herein are for illustrative purposes. Other modifications that may be employed are within the scope of the appended claims. Thus, by way of example, but not of limitation, alternative configurations of the appended claims may be utilized in accordance with the teachings herein. Accordingly, the appended claims are not limited to that precisely as shown and described.

What is claimed is:

1. An image diversion system sized and configured for use with a handheld image capture device, comprising a deviating optical element configured to provide only a first forward-looking view to an imager of the image capture device and a second substantially 180° backward-looking view to the imager, which second view is substantially 180° backward-looking relative to the imager, wherein the image diversion system comprises an optical system configured to passively, non-electronically provide both the forward-looking view and the backward-looking view with no parity change relative to the forward-looking view, the image diversion system comprising a first forward-looking optical element, a second backward-looking optical element and a deviating optical element disposed between the first forward-looking optical element and the second backward-looking optical element, wherein the deviating optical element is configured to alternately a) receive the first forward-looking view from first forward-looking optical element and to transmit the first forward-looking view to the imager, and b) receive the second backward-looking view from the second backward-looking optical element and to transmit the second backward-looking view to the imager.

2. The image diversion system according to claim 1, wherein said deviating optical element is rotatably positionable in a first position to provide said first view and at least a second position to provide said second view.

3. The image diversion system of claim 1, wherein said deviating optical element comprises a right-angled prism.

4. The image diversion system of claim 1, wherein the first forward-looking optical element comprises a first set of corrective lenses optically coupled to said deviating optical element to couple light entering from a first side of said image capture device; and the second backward-looking optical element comprises a second set of corrective lenses optically coupled to said deviating optical element to couple light entering from at least a second side of said image capture device.

5. The image diversion system according to claim 1, wherein said deviating optical element comprises a beam splitter to simultaneously provide both the first forward-looking view and the second backward-looking view to the imager.

6. An image diversion system sized and configured for use with a handheld image capture device comprising an imaging system receiving a forward-looking view, comprising: a first deviating optical element and a second deviating optical element together configured to provide only the forward-looking view and a backward-looking view to the imager that is substantially 180° reversed relative to the forward-looking view, which backward-looking view is substantially 180° backward-looking relative to the imager; and at least one corrective lens; wherein said image diversion system is contained within a housing that is attachable to a housing portion of the handheld image capture device, and wherein the image diversion system comprises an optical system configured to passively, non-electronically provide the backward-looking view with no parity change relative to the forward-looking view.

7. The image diversion system according to claim 6, wherein said second deviating optical element is rotatably positionable over a 45° degree angle relative to the first deviating optical element.

8. The image diversion system according to claim 6, wherein light from an object enters from a first direction and passes through said at least one corrective lens and light emerging from said at least one corrective lens is reflected by an input surface of said first deviating optical element.

9. The image diversion system according to claim 8, wherein light reflected by said input surface of said first deviating optical element is reflected by said second deviating optical element in a first direction.

10. The image diversion system according to claim 9, comprising at least a second corrective lens, wherein when said second deviating optical element is rotated 45°, light from an object enters from a second direction, where said second direction is substantially 180° apart from said first direction and said light passes through the least second corrective lens.

11. The image diversion system of claim 6, wherein said second optical element comprises a right-angled prism.

12. The image diversion system of claim 6, wherein said second optical element comprises a beam splitter to simultaneously provide both the first forward-looking view and the second backward-looking view to the imager.

13. The image diversion system according to claim 5, wherein the first deviating optical element is rotatably positionable about 90° relative to the second deviating optical element.

14. The image diversion system according to claim 5, wherein said first deviating optical element comprises a right-angled prism.

15. The image diversion system according to claim 5, wherein said first deviating optical element comprises a beam splitter to simultaneously provide both the first forward-looking view and the second backward-looking view to the imager.

* * * * *